(12) United States Patent
Kishiyama et al.

(10) Patent No.: US 10,721,615 B2
(45) Date of Patent: Jul. 21, 2020

(54) TERMINAL AND RADIO COMMUNICATION METHOD FOR MANAGING A SUPPORTABLE DELAY USING CAPABILITY INFORMATION

(71) Applicant: NTT DOCOMO, INC., Tokyo (JP)

(72) Inventors: Yoshihisa Kishiyama, Tokyo (JP); Kazuki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/080,593

(22) PCT Filed: Feb. 27, 2017

(86) PCT No.: PCT/JP2017/007512
§ 371 (c)(1),
(2) Date: Aug. 28, 2018

(87) PCT Pub. No.: WO2017/150453
PCT Pub. Date: Sep. 8, 2017

(65) Prior Publication Data
US 2019/0069164 A1    Feb. 28, 2019

(30) Foreign Application Priority Data

Feb. 29, 2016 (JP) ................................. 2016-038174

(51) Int. Cl.
*H04L 12/28* (2006.01)
*H04W 8/20* (2009.01)
(Continued)

(52) U.S. Cl.
CPC ............ *H04W 8/20* (2013.01); *H04B 17/364* (2015.01); *H04L 5/0053* (2013.01); *H04W 8/24* (2013.01);
(Continued)

(58) Field of Classification Search
CPC .......... H04W 72/0413; H04W 72/1278; H04B 17/364
(Continued)

(56) References Cited

U.S. PATENT DOCUMENTS

2005/0157694 A1* 7/2005 Lu .................. H04J 3/1694
370/345
2010/0098009 A1* 4/2010 Higuchi ............ H01Q 1/246
370/329
(Continued)

FOREIGN PATENT DOCUMENTS

CN           104468030 A        3/2015

OTHER PUBLICATIONS

3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
(Continued)

*Primary Examiner* — John Pezzlo
(74) *Attorney, Agent, or Firm* — Osha Liang LLP

(57) ABSTRACT

This invention aims to achieve appropriate communication even when a radio frame configuration which may involve short-time feedback is used. In an aspect of this invention, provided is a user terminal in a system which performs communication based on a TTI (Transmission Time Interval) length, the equipment including a transmission and reception unit which transmits and/or receives capability information concerning a supportable delay, and a control unit which performs control to receive a certain downlink radio resource and/or transmit a certain uplink radio resource at a time interval equal to or greater than the delay.

6 Claims, 15 Drawing Sheets

(51) Int. Cl.
*H04W 8/24* (2009.01)
*H04W 72/12* (2009.01)
*H04B 17/364* (2015.01)
*H04L 5/00* (2006.01)
*H04W 72/04* (2009.01)
*H04J 1/16* (2006.01)

(52) U.S. Cl.
CPC ... *H04W 72/0413* (2013.01); *H04W 72/1278* (2013.01)

(58) Field of Classification Search
USPC ........................................ 370/252, 329, 386
See application file for complete search history.

(56) References Cited

U.S. PATENT DOCUMENTS

2017/0164363 A1    6/2017  Zhang et al.
2018/0254868 A1*   9/2018  Saito .................. H04L 27/2611

OTHER PUBLICATIONS

International Search Report issued in PCT/JP2017/007512 dated Mar. 21, 2017 (1 page).
Written Opinion issued in PCT/JP2017/007512 dated Mar. 21, 2017 (3 pages).
Extended European Search Report issued in the counterpart European Patent Application No. 17759919.8, dated Jun. 18, 2019 (16 pages).

* cited by examiner

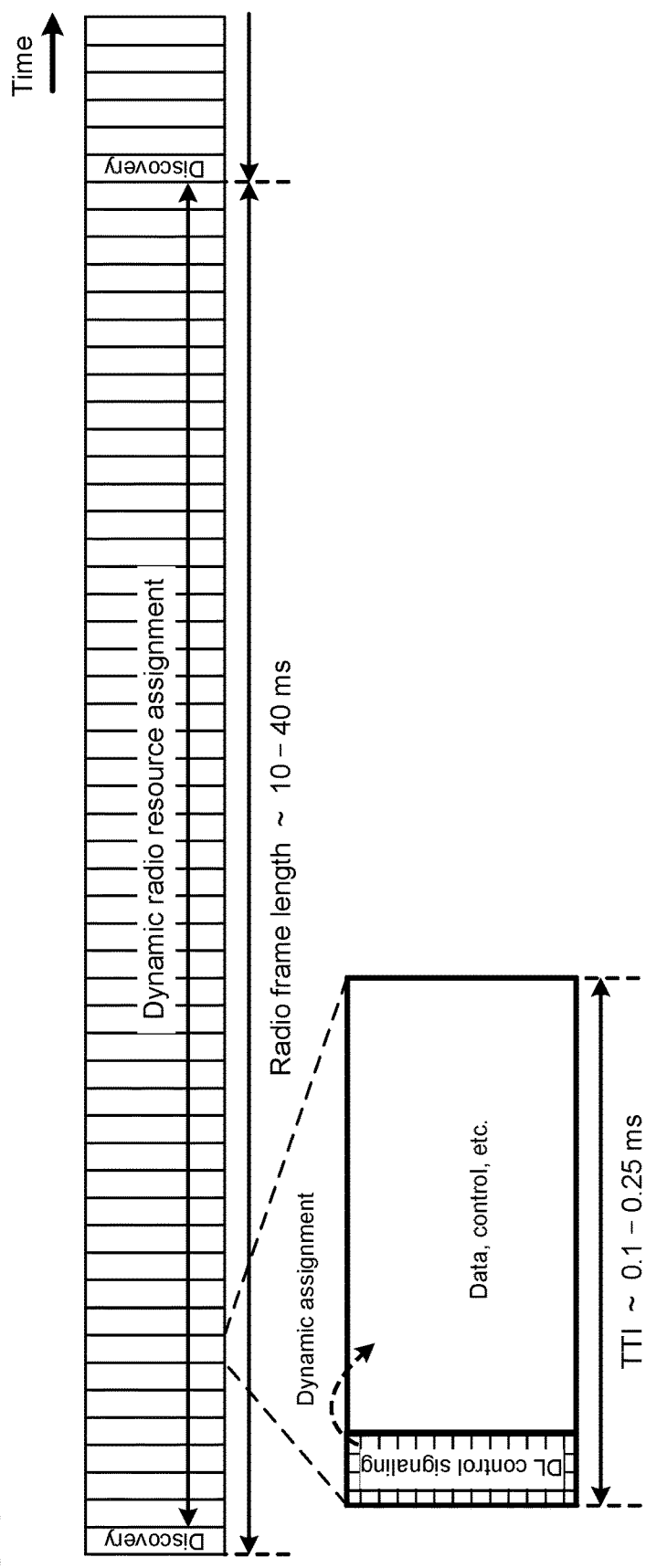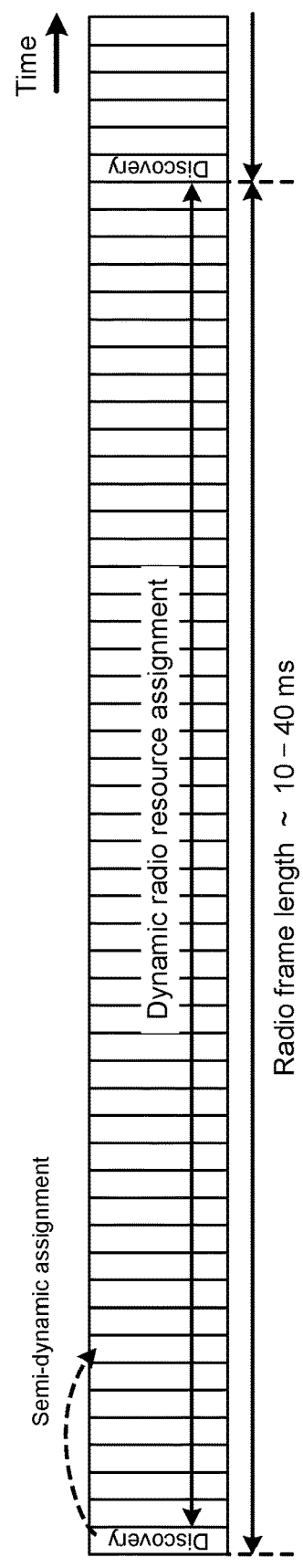
FIG. 3A
FIG. 3B

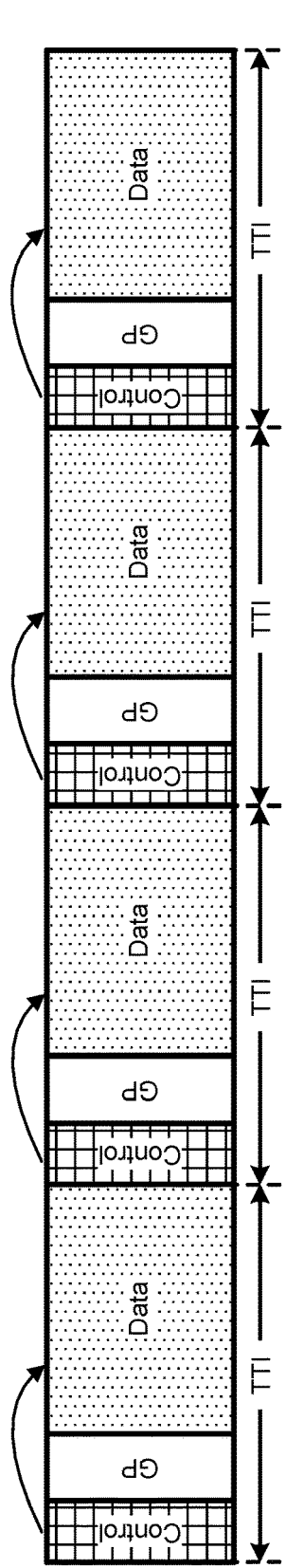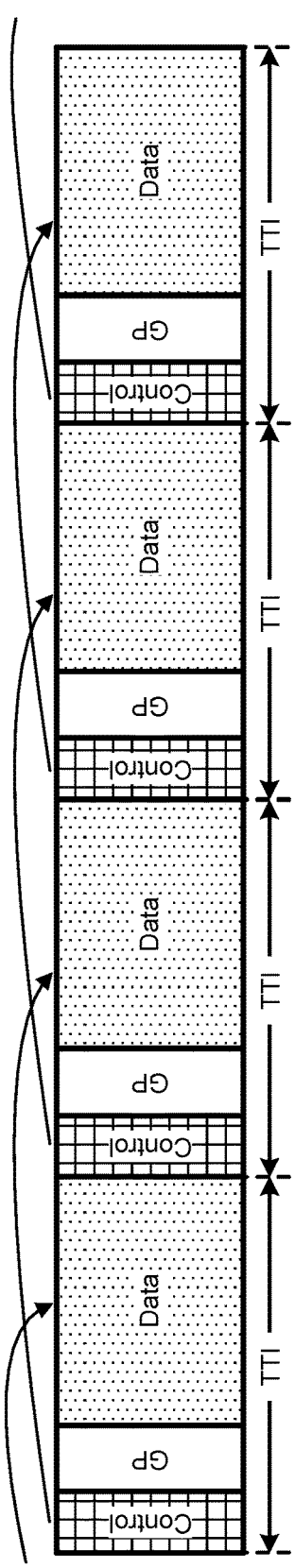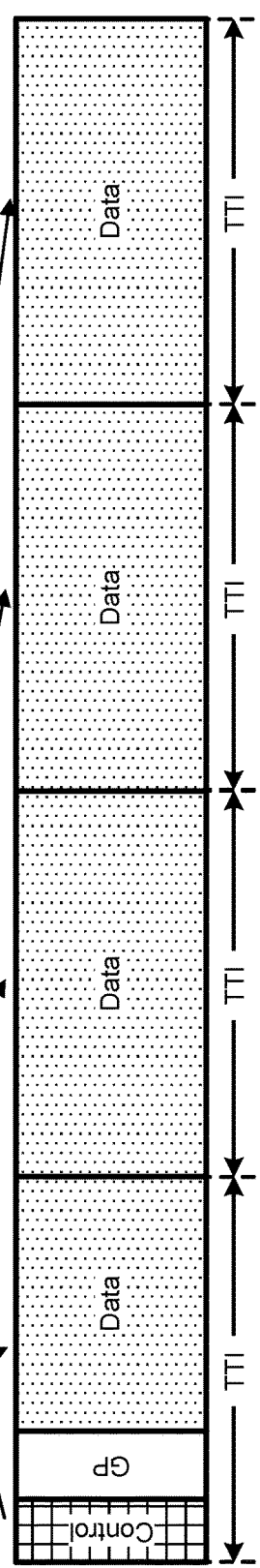

TERMINAL AND RADIO COMMUNICATION METHOD FOR MANAGING A SUPPORTABLE DELAY USING CAPABILITY INFORMATION

TECHNICAL FIELD

The present invention relates to a user terminal, a radio base station, and a radio communication method for next-generation mobile communication systems.

BACKGROUND ART

In UMTS (Universal Mobile Telecommunications System) networks, LTE (Long Term Evolution) has been specified to achieve, e.g., higher data rates and lower delays (non-patent literature 1). To achieve broader bands and higher speeds than LTE, successors to LTE (called, e.g., LTE-A (LTE-Advanced), FRA (Future Radio Access), 5G (5th generation mobile communication systems), and New-RAT (Radio Access Technology)) are also under study.

Existing LTE systems utilize control based on TDD (Time Division Duplex) or FDD (Frequency Division Duplex). In, e.g., TDD, the use of each subframe for either a UL (Uplink) or a DL (Downlink) is strictly defined on the basis of the UL/DL configuration.

CITATIONS LIST

Non-Patent Literature

Non-patent literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

In wireless (radio) communication systems (e.g., 5G) of LTE Rel. 13 or later, radio frames which are highly expandable in the future and excellent in power saving performance are under study. With such radio frames, signals are considered to be transmitted in a short time as close together as possible while communication is kept stopped when no data is to be transmitted and received. Hence, feedback with an extra-low delay of 1 ms or less, for example, is considered to be achieved.

However, it may be difficult to implement such extra-low delay feedback due, e.g., to variations in signal processing detail or environment. Depending on the conditions, the communication quality may degrade due to too slow processing, resulting in inappropriate communication.

The present invention has been made in consideration of the above-described issue, and has as one object to provide a user terminal, a radio base station, and a radio communication method which can achieve appropriate communication even when a radio frame configuration which may involve short-time feedback is used.

Solution to Problem

In an aspect of the present invention, provided is a user terminal in a system which performs communication based on a TTI (Transmission Time Interval) length, the equipment including a transmission and reception unit which transmits and/or receives capability information concerning a supportable delay, and a control unit which performs control to receive a certain downlink radio resource and/or transmit a certain uplink radio resource at a time interval of not less than the delay.

Advantageous Effects of Invention

According to the present invention, appropriate communication can be achieved even when a radio frame configuration which may involve short-time feedback is used.

BRIEF DESCRIPTION OF DRAWINGS

FIGS. 3A and 3B are diagrams illustrating exemplary configurations of lean radio frames.

FIGS. 8A to 8C are diagrams illustrating another exemplary comparison between intra-TTI scheduling and inter-TTI scheduling.

DESCRIPTION OF EMBODIMENTS

In existing LTE systems (Rel. 8-12), a radio base station (eNB: evolved Node B) schedules data transmission and reception using downlink control channels for a user terminal (UE: User Equipment). More specifically, DL scheduling and UL scheduling based on DCI (Downlink Control Information) notified by a PDCCH (Physical Downlink Control Channel)/EPDCCH (Enhanced PDCCH) are defined.

Figure 1:
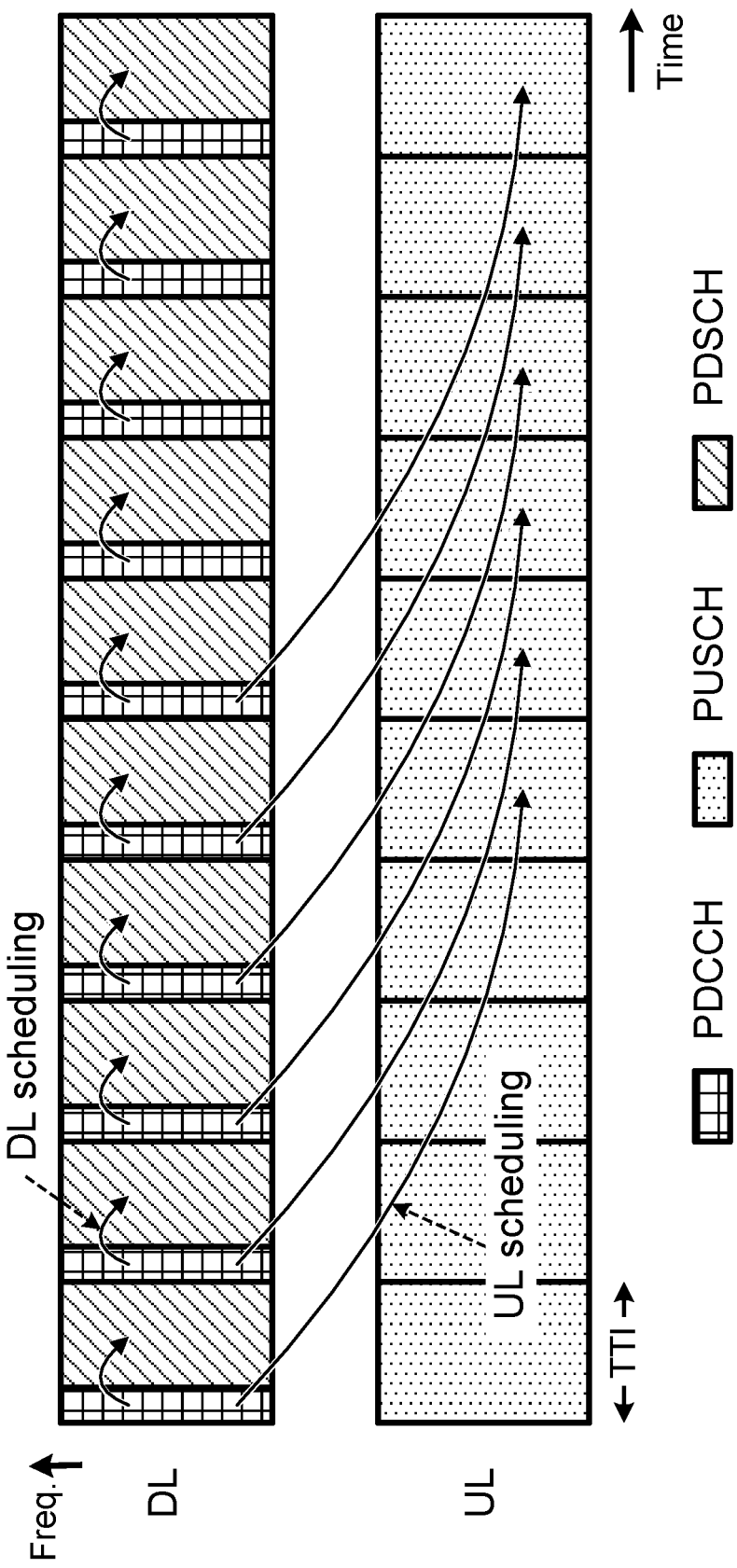
FIG. 1 is a diagram illustrating exemplary data scheduling in existing LTE systems.

FIG. 1 is a diagram illustrating exemplary data scheduling in existing LTE systems. FIG. 1 illustrates DL scheduling and UL scheduling instructed by DCI received by a PDCCH. The UE receives a PDSCH (Physical Downlink Shared Channel) on the basis of a DL grant (to be also referred to as a DL assignment (downlink assignment) hereinafter) conforming to, e.g., DCI format 1A, using the same subframe as that in which the DL grant is detected, as illustrated as FIG. 1.

The UE transmits a PUSCH (Physical Uplink Shared Channel) on the basis of a UL grant (uplink grant) conforming to, e.g., DCI format 0/4, using a subframe that is a predetermined period (e.g., four subframes) after the subframe in which the UL grant is detected.

Downlink control information (which may also be referred to as, e.g., uplink scheduling information or uplink scheduling control information) for scheduling uplink data transmission will be referred to as a UL grant hereinafter, and downlink control information (which may also be referred to as, e.g., downlink scheduling information or downlink scheduling control information) for scheduling downlink data reception will be referred to as a DL grant hereinafter, but their names are not limited to this. Downlink control information (downlink control signal) may also be referred to as, e.g., L1/L2 (Layer 1/Layer 2) control information (L1/L2 control signal), or simply as L1 control information (L1 control signal).

The subframe may also be referred to as a TTI (Transmission Time Interval). The TTI (subframe) length in LTE Rel. 8-12 is 1 ms and contains two time slots. The TTI is the unit of transmission time of a channel-encoded data packet (transport block) and represents the units of processing such as scheduling and link adaptation.

Although FIG. 1 illustrates an example in which a UL/DL grant is notified by a PDCCH, the same correspondence between a scheduling TTI and a scheduled TTI, as in FIG. 1, applies to the case of an EPDCCH. A DL grant and a PDSCH may be transmitted and received using not the same carrier (CC (Component Carrier) or cell) but different carriers. A UL grant and a PUSCH may be transmitted and received using not the same carrier but different carriers.

The existing LTE systems utilize control based on TDD (Time Division Duplex) or FDD (Frequency Division Duplex). More specifically, the use of time/frequency resources for either a DL or a UL is strictly defined for each predetermined unit (e.g., subframes for time resources and CCs for frequency resources).

The existing LTE systems further utilize retransmission control based on HARQ (Hybrid Automatic Repeat request). In HARQ, the transmitting side can decide whether to retransmit data or transmit new data, in response to feedback of delivery acknowledgement information (to be also be referred to as, e.g., retransmission control information, HARQ-ACK, or ACK/NACK (A/N: Acknowledgement/Negative-Acknowledgement) hereinafter) from the receiving side.

Delivery acknowledgement information may be notified by not transmitting ACK/NACK (DTX: Discontinuous Transmission). In other words, when the receiver (the eNB or the UE) may not detect ACK/NACK from the transmitter (the UE or the eNB), it can interpret delivery acknowledgement information for the corresponding data as NACK.

Figure 2A:
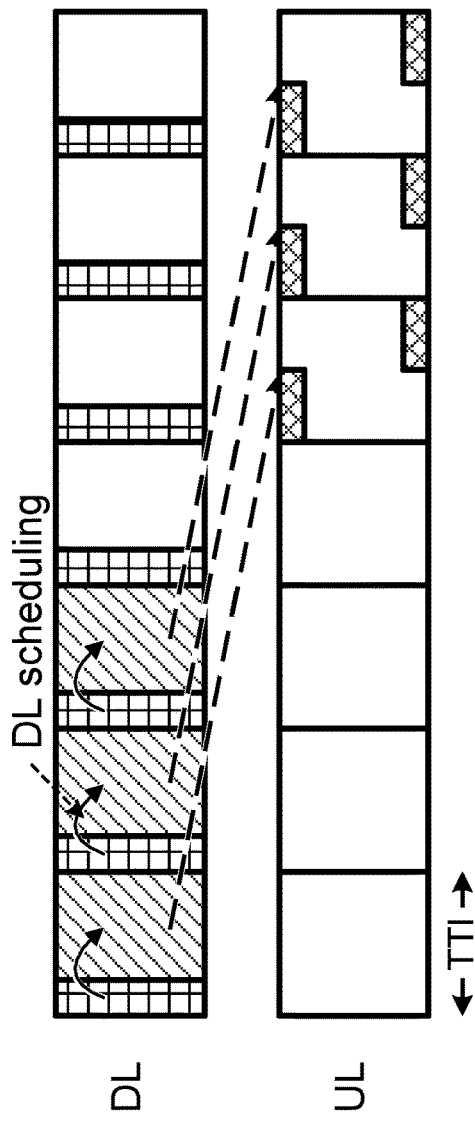
FIGS. 2A and 2B are diagrams illustrating exemplary HARQ-ACK timings in the existing LTE systems.

In the existing LTE systems, the timings at which the UE transmits/receives HARQ-ACK for data are defined. FIG. 2 illustrates diagrams of exemplary HARQ-ACK timings in the existing LTE systems. FIG. 2A illustrates HARQ-ACK transmission timings corresponding to DL scheduling based on a DL grant. The UE transmits HARQ-ACK, in principle, four or more subframes after receiving a PDSCH. HARQ-ACK may support frequency hopping, as illustrated as FIG. 2A.

Figure 2B:
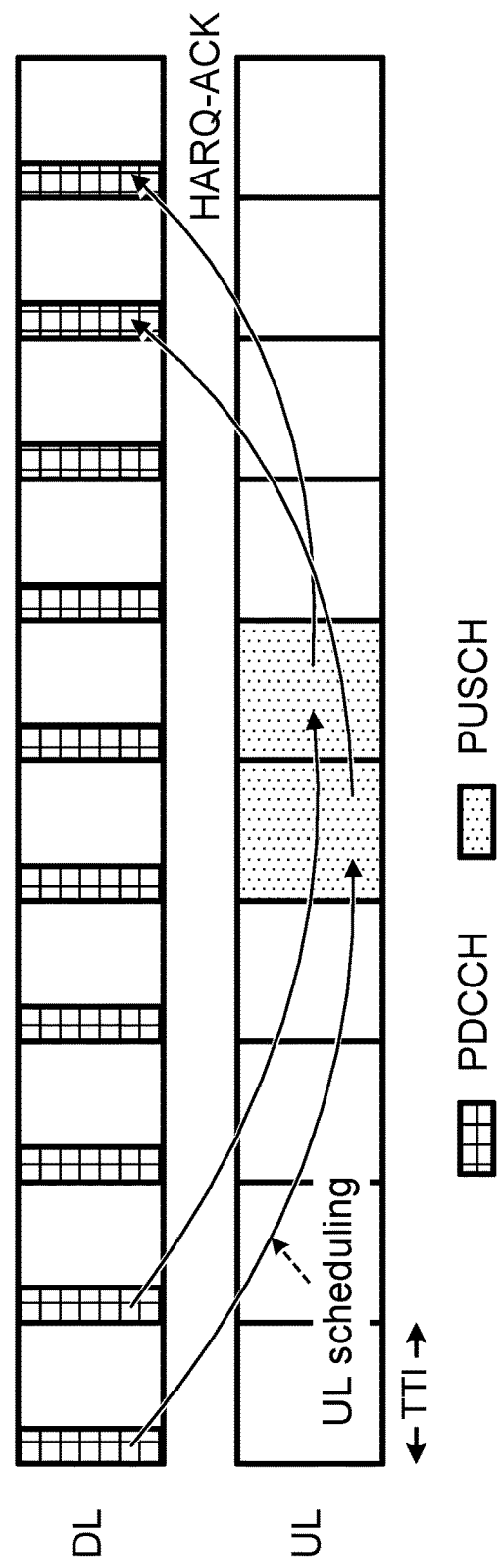

FIG. 2B illustrates HARQ-ACK transmission timings corresponding to UL scheduling based on a UL grant. The UE receives HARQ-ACK, in principle, four or more subframes after transmitting a PUSCH.

In radio communication systems (e.g., 5G) of LTE Rel. 13 or later, radio frames which are highly expandable in the future and excellent in power saving performance are under study. A lean radio frame, for example, is available as one of such radio frames. A system which uses a lean radio frame can transmit signals in a short time as close together as possible while communication is kept stopped when no data is to be transmitted and received.

To enable short-time communication, an assignment in which transmission and reception control (scheduling) is completed in the TTI has been examined. The assignment will also be referred to as a self-contained assignment hereinafter. A TTI in which a self-contained assignment takes place may be referred to as a self-contained TTI.

The self-contained TTI may also be referred to as, e.g., a self-contained subframe or a self-contained symbol set, or other names. TDD which uses the self-contained TTI may be referred to as self-contained TDD or other names.

In one self-contained TTI, for example, the UE or the eNB transmits and/or receives downlink control information, transmits and/or receives data based on the downlink control information, and transmits and/or receives predetermined information (e.g., feedback information corresponding to the data). A specific configuration of the self-contained TTI will be described later in this specification.

With the self-contained TTI, feedback with an extra-low delay of 1 ms or less, for example, can be achieved, thus involving neither the conventional scheduling restrictions nor HARQ feedback timing control.

However, such extra-low delay feedback may involve high-speed signal processing (e.g., demodulation and signal generation) in the UE and the eNB. Hence, any UE or eNB is expected to be incapable of extra-low delay feedback, in consideration of the implementation costs.

Even a UE/eNB having the capability of processing signals at high speed may not implement extra-low delay feedback, depending on the conditions (e.g., depending on the processing details or the environment). An advanced terminal (advanced receiver) which performs advanced reception processing (e.g., interference cancellation) for received signals, a terminal which may involve channel estimation for a long time in a high-speed mobile environment, and a terminal which performs communication in a cell having a very large radius, for example, cause high communication delays (including, e.g., a feedback delay and a processing delay) and may therefore process signals only in a short time.

Control that assumes such feedback performed for a UE incapable of extra-low delay feedback may fail to complete processing within an intended period of time, and the communication quality may degrade, resulting in inappropriate communication.

In view of this, the inventors of the present invention hit on the idea of making the UE and/or the eNB transmit capability information (capability) related to a supportable delay. In an aspect of the present invention, a device having received the capability information can determine a delay which can be supported by a communication partner device, communication can be executed with an appropriate radio frame configuration (including the TTI configuration).

The capability information concerning a supportable delay may also be referred to as, e.g., a delay capability or an RTT (Round-Trip Time) capability.

Each embodiment according to the present invention will be described in detail below with reference to the drawings. Radio communication methods according to the respective embodiments may be employed solely or in combination.

In the following embodiments, the subframe (TTI) may be the TTI (a TTI having a time length of 1 ms) in existing LTE (e.g., LTE Rel. 8-12), may be a period (e.g., one to 13 symbols) shorter than 1 ms, or may be a period longer than 1 ms. The TTI shorter than 1 ms may also be referred to as a shortened TTI.

(Radio Communication Method)

The configuration of a lean radio frame will be specifically described first. A TTI configuration (e.g., a self-contained TTI) with its time domain changed flexibly, used for the lean radio frame, will be described subsequently. Control of a radio frame configuration based on a delay capability will then be described.

<Lean Radio Frame>

FIG. 3 illustrates diagrams of exemplary configurations of lean radio frames. FIG. 3A illustrates an exemplary dynamic assignment (e.g., scheduling for each TTI), and FIG. 3B illustrates an exemplary semi-dynamic assignment (e.g., scheduling for each radio frame or each set of TTIs).

Referring to FIGS. 3A and 3B, the radio frame length is set to a predetermined length (e.g., 10 to 40 ms). To allow short-time transmission and reception, the TTI is set to a shortened TTI such as 0.1 to 0.25 ms. The radio frame length and the TTI length are not limited to the examples illustrated as FIG. 3.

In a carrier (which may also be referred to as a lean carrier) in which a lean radio frame is used, discovery (detection) and/or mobility control which uses a low-overhead signal is supported. The signal may also be referred to as, e.g., a detection signal, a detection and measurement signal, a mobility measurement signal, a DRS (Discovery Reference Signal), or a DS (Discovery Signal).

The DS of the lean radio frame may be configured on the basis of the DS defined in LTE Rel. 12, or may include at least one of sync signals (a PSS (Primary Synchronization Signal)/SSS (Secondary Synchronization Signal)), a CRS (Cell-specific Reference signal), and a CSI-RS (Channel State Information Reference Signal). The DS configuration is not limited to this, and may be implemented in a modification/expansion of the existing DS or may include a signal/information which may be involved in communication.

The UE attempts to receive a DS in the first TTI of each radio frame. The UE may perform, e.g., synchronization processing and/or measurement (e.g., RRM (Radio Resource Management) measurement including RSRP (Reference Signal Received Power) measurement or the like) on the basis of the DS. The TTI in which a DS is transmitted may be referred to as, e.g., a DS-TTI (Discovery Signal TTI) or a DS subframe (Discovery Signal subframe). The DS-TTI configuration is not limited to the example illustrated as FIG. 3. A DS may be transmitted in, e.g., a given TTI or a set of TTIs of the radio frame.

In the case of FIG. 3A, in each TTI other than the DS-TTI, a dynamic radio resource assignment is performed using, e.g., a self-contained TTI. The UE attempts to receive a downlink control signal (e.g., L1/L2 control information) in each TTI, and transmits and/or receives a signal in the same TTI on the basis of the downlink control signal upon success of decoding.

In the case of FIG. 3B, a semi-dynamic radio resource assignment is performed on the basis of a downlink signal transmitted in a DS-TTI. For example, the UE may receive at least one of broadcast information (e.g., an MIB (Master Information Block) or an SIB (System Information Block)) in a DS-TTI and downlink control information (e.g., DCI) or a combination thereof, and determine a radio resource assignment related to a certain TTI other than the DS-TTI on the basis of the received information.

<TTI Configurations Used in Lean Radio Frames>

Figure 4A:
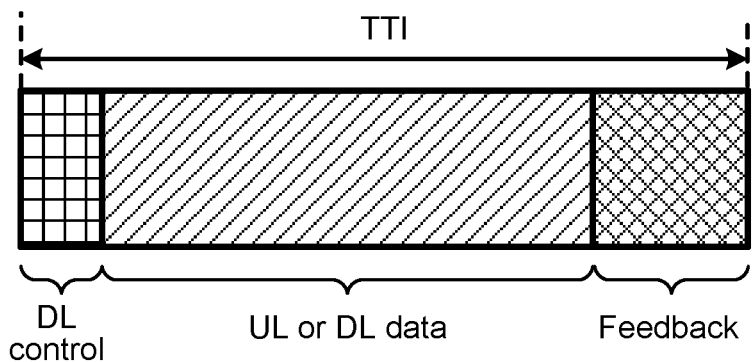
FIGS. 4A to 4C are diagrams illustrating exemplary self-contained TTI configurations.

In a lean radio frame, a self-contained TTI is preferably used to achieve a low delay. FIG. 4 illustrates diagrams of exemplary self-contained TTI configurations. FIG. 4A illustrates a schematic diagram of a radio resource arrangement according to a self-contained TTI. One self-contained TTI includes a downlink control signal interval (which may also be referred to as, e.g., an assignment interval, a scheduling interval, or a downlink control channel region) in which a downlink control signal is located, a data interval (which may also be referred to as, e.g., a data region) in which data is located, and a feedback interval (which may also be referred to as, e.g., an uplink control channel interval, an HARQ-ACK (A/N) interval, or a feedback channel region) in which a feedback signal is located.

The lengths and order of the respective intervals (periods) may be set in any combinations. Even when, for example, at least one interval (e.g., the length of a downlink control signal interval) has zero length, the TTI used may be referred to as a self-contained TTI. Even for a TTI including at least one interval (e.g., a data interval), the TTI used may be referred to as a self-contained TTI. A method for controlling the length of each interval will be described later.

Figure 4B:
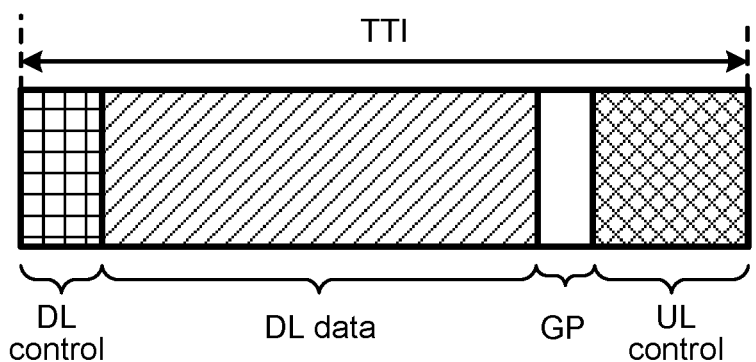

FIG. 4B illustrates an exemplary radio resource arrangement according to a self-contained TTI for DL data (for DL data transmission). In the self-contained TTI for DL data, the UE receives scheduling information (DL grant) using a downlink control channel (e.g., a PDCCH) in the downlink control signal interval, receives data on the basis of the DL grant in the data interval, and transmits an uplink control signal (e.g., A/N) in response to the data in the feedback interval.

Figure 4C:
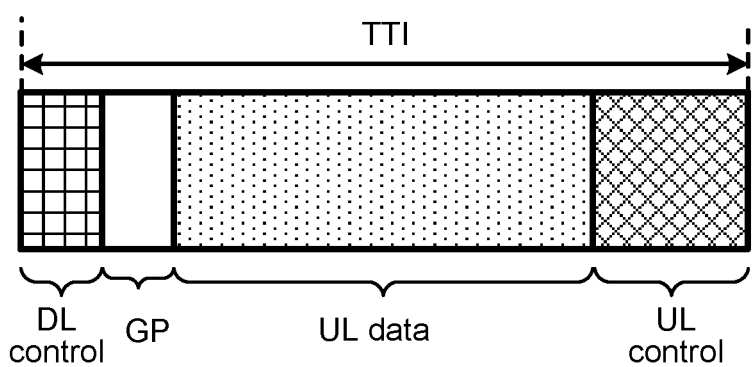

FIG. 4C illustrates an exemplary radio resource arrangement according to a self-contained TTI for UL data (for UL data transmission). In the self-contained TTI for UL data, the UE receives scheduling information (UL grant) in the downlink control signal interval, transmits data on the basis of the UL grant in the data interval, and further transmits an uplink control signal (e.g., A/N of a different subframe) in the feedback interval. The UE may receive a downlink control signal (e.g., A/N transmitted from the eNB in response to uplink data) in the feedback interval. In this case, the downlink control signal interval and the feedback interval may temporally overlap each other.

The self-contained TTI may be provided with a non-transmission period (which may also be referred to as, e.g., a GP (Guard Period), a gap, a switching gap, or a GP interval). Providing a guard period allows UL/DL switching in the TTI. A GP is introduced assuming that TA (Timing Advance) is applied to the UE. For the TA, a value larger than zero may be set as a minimum value. After TA application, a GP having a predetermined length may be set between the transmission interval and the reception interval of the UE.

FIG. 4B, described above, illustrates an exemplary guard period set between the data interval and the feedback interval in the self-contained TTI for DL data. FIG. 4C illustrates an exemplary guard period set between the downlink control signal interval and the data interval in the self-contained TTI for UL data. In the self-contained TTI, a GP may even be defined between other intervals. When a plurality of GPs are defined in the self-contained TTI, the GPs may have the same or different lengths.

The GP may be defined as one or more symbol periods. The symbol period may be, for example, represented in the unit of OFDM (Orthogonal Frequency Division Multiplexing)/SC-FDMA (Single Carrier Frequency Division Multiple Access) symbol, represented in the unit of reciprocal (i.e., sampling length) of a certain bandwidth, or represented in other units.

Each interval may be configured to transmit a given channel/signal by a predetermined resource. In, e.g., the feedback interval of the self-contained TTI for DL data, not only A/N for downlink data but also, e.g., UCI (Uplink Control Information) (e.g., a CQI (Channel Quality Indicator) and an RI (Rank Indicator)), uplink reference signals, and uplink data, other than A/N, may be transmitted. In the feedback interval of the self-contained TTI for UL data as well, uplink control information, uplink reference signals, and uplink data, for example, may be transmitted.

In the feedback interval, A/N for uplink data, downlink control information for the next TTI (immediately subsequent to the TTI in question), and measurement signals (e.g., a CRS (Cell-specific Reference signal) and a CSI-RS (Channel State Information-Reference Signal)), for example, may be transmitted. In the feedback interval, the UE may attempt to perform blind detection of a DL and/or UL grant, or measure a predetermined reference signal set in advance by upper layer signaling (e.g., RRC (Radio Resource Control) signaling).

<Specific Examples of TTI Configurations>

In an embodiment of the present invention, a radio resource assignment for symbols included in each TTI can be completely dynamically controlled. For example, the UE dynamically changes the UL/DL ratio in a self-contained III in accordance with the contents of a downlink control signal received in the downlink control signal interval of the TTI.

FIG. 5 illustrates diagrams of exemplary TTI configurations for DL data. Although FIG. 5 illustrates an example in which one TTI includes 14 symbols (e.g., 14 OFDM symbols), the present invention is not limited to this. Each TTI preferably includes symbols in number enough to ensure a sufficient temporal granularity (degree of freedom of symbol change), and at least one symbol is preferably used in the downlink control signal interval.

Downlink control information (e.g., DCI) notified to the UE in the downlink control signal interval includes information concerning, e.g., the configurations of a self-contained TTI (e.g., at least one of the lengths of the respective intervals (the lengths of a downlink control signal interval, a data interval, a feedback interval, and a GP), and the amount of radio resource used in at least one of the respective intervals). Examples of the information concerning the interval lengths may include the first symbol, the last symbol, the number of symbols, and the symbol length in the interval. The downlink control information preferably includes information concerning signal transmission and/or reception processing (e.g., modulation, demodulation, precoding, and a scramble identifier).

The UE receives in the downlink control signal interval, downlink control signals (e.g., a DL grant and a UL grant) for specifying the symbol positions in the data interval and/or the feedback interval and determines a TTI configuration (TTI symbol configuration).

Partial intervals of each TTI may not be controlled dynamically. For example, at least part of information concerning a self-contained TTI configuration may be notified to the UE by upper layer signaling (e.g., RRC signaling or broadcast information). Partial intervals may be configured to be fixedly used in advance, and, for example, the UE and/or the eNB may perform transmission and/or reception processing assuming at least the first symbol as a downlink control signal interval.

Figure 5A:
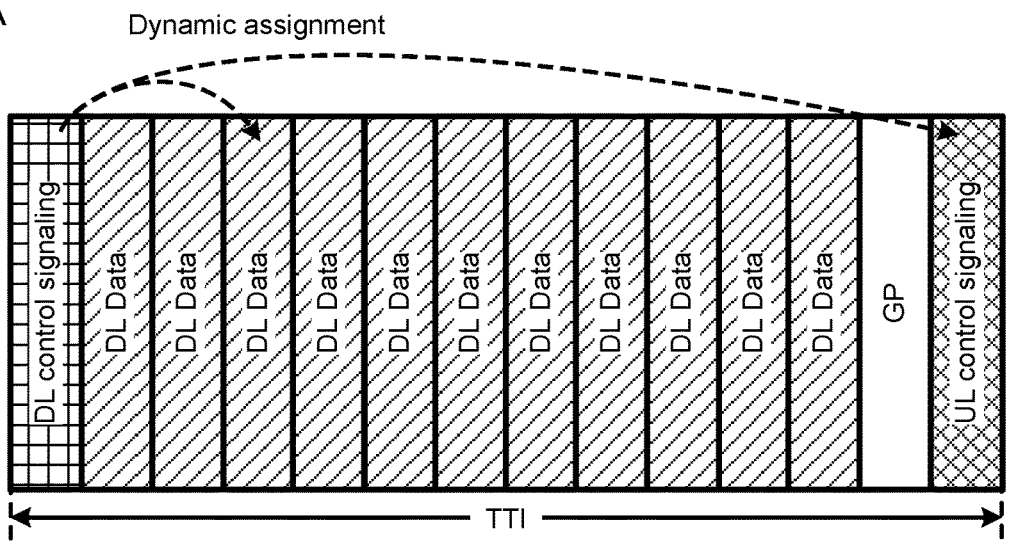
FIGS. 5A to 5C are diagrams illustrating exemplary TTI configurations for DL data.

The TTI configuration illustrated as FIG. 5A can be used as the basic configuration of the DL data TTI. In this configuration, the first symbol of the TTI forms a downlink control signal interval, the second to 12th symbols form a data interval (the interval in which a downlink data signal is received), the 13th symbol forms a GP, and the 14th symbol forms a feedback interval (the interval in which an uplink control signal is transmitted).

Figure 5B:
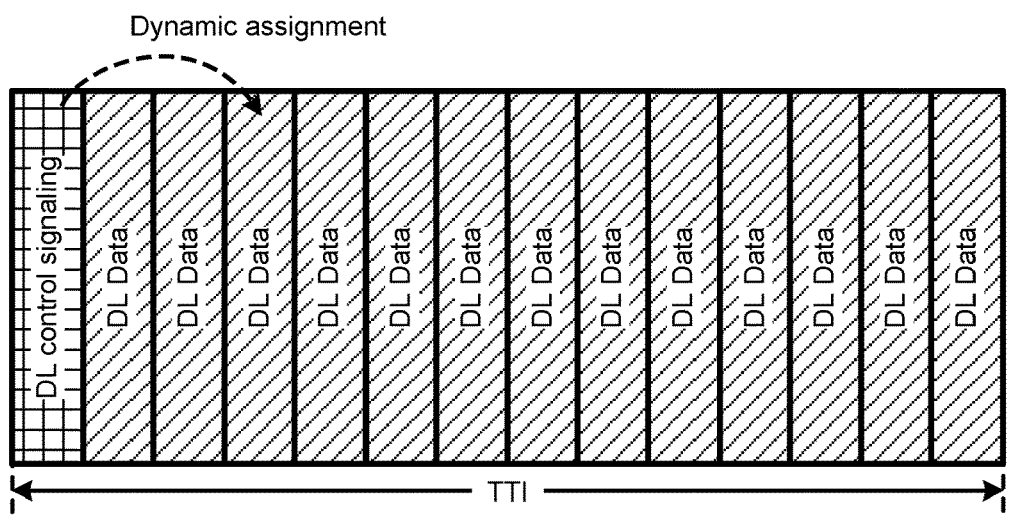

The TTI configuration illustrated as FIG. 5B can be used as a low-overhead configuration for the DL data TTI. In this configuration, the first symbol of the TTI forms a downlink control signal interval and the second to 14th symbols form a data interval.

Figure 5C:
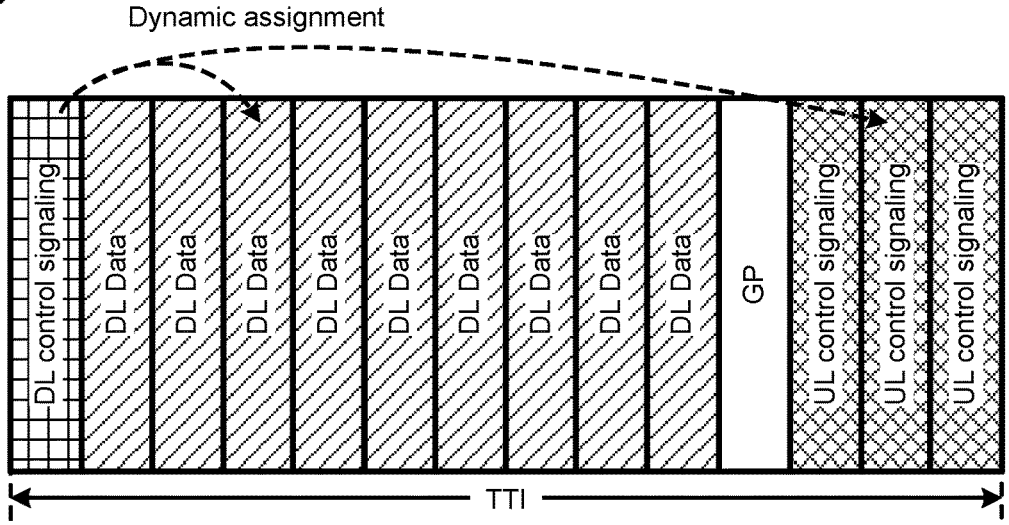

The TTI configuration illustrated as FIG. 5C can be used as a feedback-oriented configuration for the DL data TTI. In this configuration, the first symbol of the TTI forms a downlink control signal interval, the second to 10th symbols form a data interval, the 11th symbol forms a GP, and the 12th to 14th symbols form a feedback interval.

FIG. 6 illustrates diagrams of exemplary TTI configurations for UL data. Although FIG. 6 illustrates an example in which one TTI includes 14 symbols (e.g., 14 OFDM symbols), the present invention is not limited to this, as in FIG. 5.

Downlink control information notified to the UE in the downlink control signal interval may be the same as in the example illustrated as FIG. 5. The UE receives in the downlink control signal interval, downlink control signals (e.g., a UL grant) for specifying the symbol positions in the data interval and/or the feedback interval and determines a TTI configuration (TTI symbol configuration).

Figure 6A:
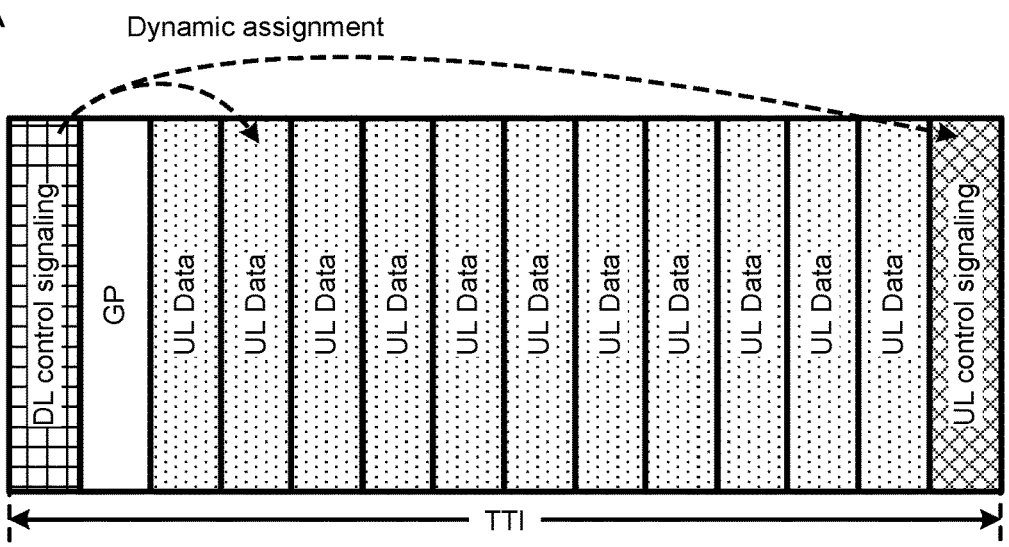
FIGS. 6A to 6C are diagrams illustrating exemplary TTI configurations for UL data.

The TTI configuration illustrated as FIG. 6A can be used as the basic configuration of the UL data TTI. In this configuration, the first symbol of the TTI forms a downlink control signal interval, the second symbol forms a GP, the third to 13th symbols form a data interval (the interval in which an uplink data signal is transmitted), and the 14th symbol forms a feedback interval (the interval in which an uplink control signal is transmitted).

Figure 6B:
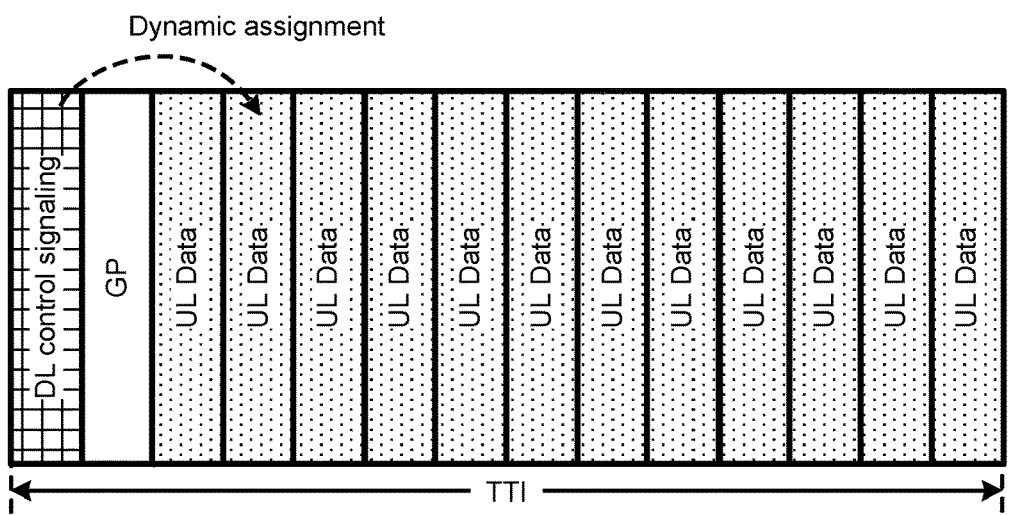

The TTI configuration illustrated as FIG. 6B can be used as a low-overhead configuration for the UL data TTI. In this configuration, the first symbol of the TTI forms a downlink control signal interval, the second symbol forms a GP, and the third to 14th symbols form a data interval.

Figure 6C:
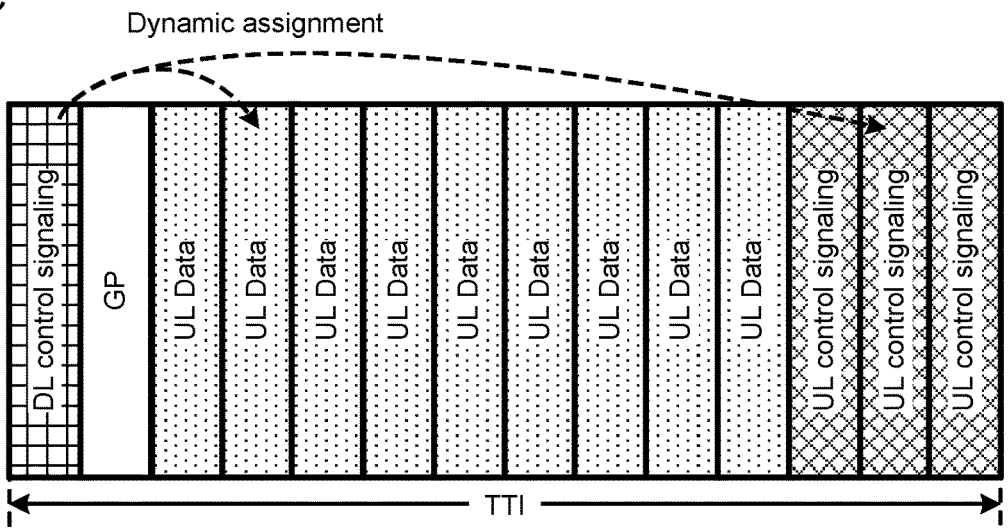

The TTI configuration illustrated as FIG. 6C can be used as a feedback-oriented configuration for the UL data TTI. In this configuration, the first symbol of the TTI forms a downlink control signal interval, the second symbol forms a GP, the third to 11th symbols form a data interval, and the 12th to 14th symbols form a feedback interval.

<Inter-TTI Scheduling>

In a lean radio frame, a non-self-contained TTI (e.g., an existing DL subframe or UL subframe) may be used in consideration of the tradeoff between performance (e.g., communication throughput) and delay. In addition, the lean radio frame is not limited to intra-TTI scheduling which uses a self-contained TTI, and inter-TTI scheduling may be performed using a downlink control signal in a certain TTI. Scheduling of a different subframe (cross-subframe scheduling) or scheduling of multiple subframes (multi-subframe scheduling), for example, may be performed.

Figure 7A:
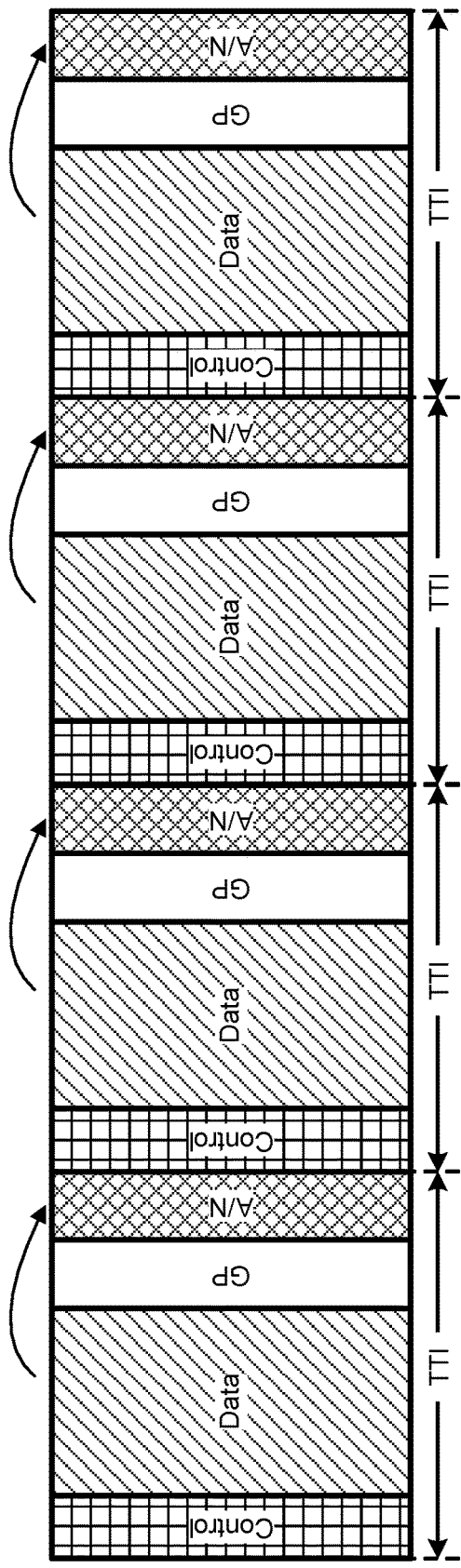
FIGS. 7A and 7B are diagrams illustrating an exemplary comparison between intra-TTI scheduling and inter-TTI scheduling.

FIG. 7 illustrates diagrams of an exemplary comparison between intra-TTI scheduling and inter-TTI scheduling. FIG. 7A illustrates an example in which self-contained TTIs for DL data, as illustrated as FIG. 4B, are temporally consecutive. With this TTI configuration, the process from scheduling information reception until feedback information transmission is completed in each TTI, and this is preferable when a low delay is prioritized.

Figure 7B:
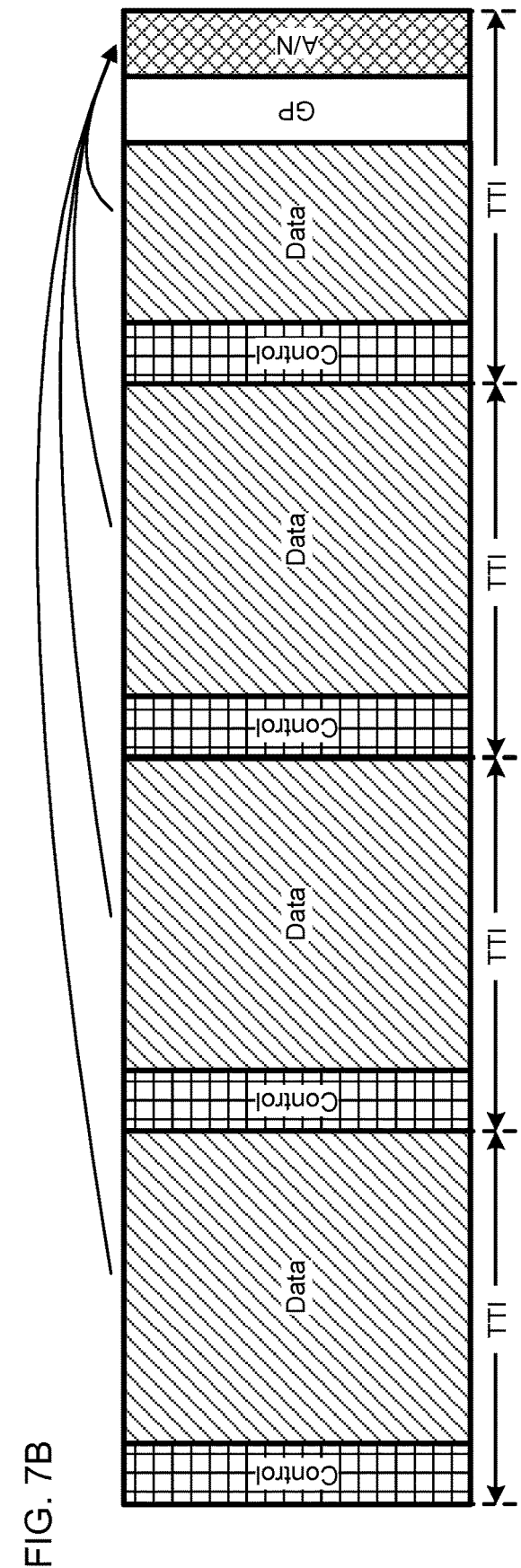

FIG. 7B illustrates an example in which a self-contained TTI for DL data follows consecutive non-self-contained TTIs. With this TTI configuration, the use of a non-self-contained TTI having neither a GP nor a feedback interval can increase the number of radio resources allocated for data transmission, and this is preferable when performance is prioritized.

Referring to FIG. 7B, A/N signals corresponding to the data of non-self-contained TTIs are collectively transmitted in the feedback interval of the subsequent self-contained TTI. In this case, the UE may generate A/N by applying at least one of HARQ-ACK multiplexing and HARQ-ACK bundling, as used in the existing LTE systems.

In this manner, the use of a configuration which delays A/N transmission can achieve, e.g., deployment of an advanced terminal having a relatively high decoding throughput, adjustment of each signal interval/GP overhead, and an extra-low delay using a radio frame for self-contained TDD. The same applies to the use of a self-contained TTI for UL data.

FIG. 8 illustrates diagrams of another exemplary comparison between intra-TTI scheduling and inter-TTI scheduling. Although FIG. 8 assumes zero feedback interval length, the present invention is not limited to this.

FIG. 8A illustrates an example in which self-contained TTIs for UL data, as illustrated as FIG. 4C, are temporally consecutive. With this TTI configuration, the process from scheduling information reception until data transmission is completed in each TTI, and this is preferable when a low delay is prioritized.

FIG. 8B illustrates an example similar to that illustrated as FIG. 8A, but is different from the latter in that data of a different TTI (e.g., immediately subsequent to the TTI in question) is scheduled using downlink control information of a certain TTI. With this TTI configuration, the degree of freedom of scheduling can be improved by tolerating a relatively long delay.

FIG. 8C illustrates an example in which consecutive non-self-contained TTIs follow a self-contained TTI for UL data. In this example, since pieces of scheduling information of the respective TTIs are collectively transmitted in the downlink control signal interval of the self-contained TTI, only data may be transmitted in the non-self-contained TTIs. With this TTI configuration, the number of radio resources allocated for data transmission can be increased, and this is preferable when performance is prioritized.

The scheduling operations illustrated as FIGS. 7 and 8 can be used regardless of whether the TTI configuration is used for DL data or UL data. Scheduling may even be performed between a DL data TTI and a UL data TTI.

<TTI Configurations of Other Physical Channels/Physical Signals>

Although TTI configurations associated with data signals and control signals used in lean radio frames have been mainly described above, the same TTI configurations are also applicable to other physical channels and physical signals. In other words, the data interval or the feedback interval may be read as intervals for other physical channels/physical signals and used.

FIG. 9 illustrates diagrams of exemplary TTI configurations of other physical channels/physical signals. Although FIG. 9 illustrates an example in which one TTI includes 14 symbols (e.g., 14 OFDM symbols), the present invention is not limited to this, as in FIG. 5.

Downlink control information notified to the UE in the downlink control signal interval may be the same as in FIG. 5. The UE receives in the downlink control signal interval, downlink control signals for specifying the symbol positions in the intervals for other physical channels/physical signals and determines a TTI configuration (TTI symbol configuration).

Figure 9A:
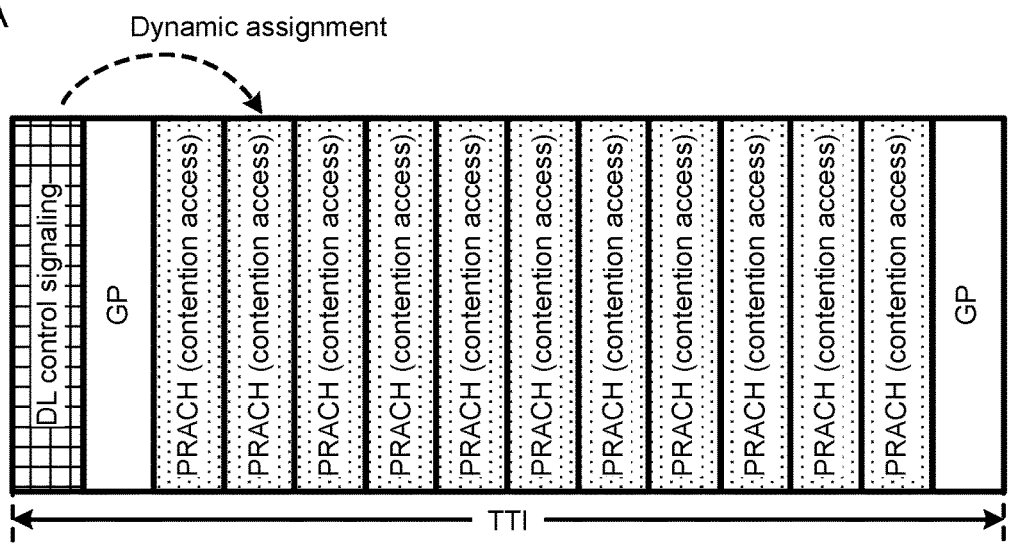
FIGS. 9A to 9C are diagrams illustrating exemplary TTI configurations of other physical channels/physical signals.

The TTI configuration illustrated as FIG. 9A can be used as a TTI configuration in which PRACHs (Physical Random Access Channels) are dynamically assigned. In this configuration, the first symbol of the TTI forms a downlink control signal interval, the second symbol forms a GP, the third to 13th symbols form a PRACH signal (random access preamble) transmission interval, and the 14th symbol forms a GP.

The UE transmits a PRACH signal in at least a part (e.g., one or more symbols) of the PRACH signal transmission interval on the basis of downlink control information. The PRACH signal may be transmitted by a randomly determined resource (contention-based random access) or transmitted by a resource indicated by downlink control information (which may also be referred to as, e.g., a PDCCH instruction) (non-contention-based random access).

A GP is preferably set after the PRACH signal transmission interval, as depicted as FIG. 9A. This can ensure a delay margin in consideration of the differences in, e.g., cell radius associated with reception of a PRACH signal in the eNB.

Figure 9B:
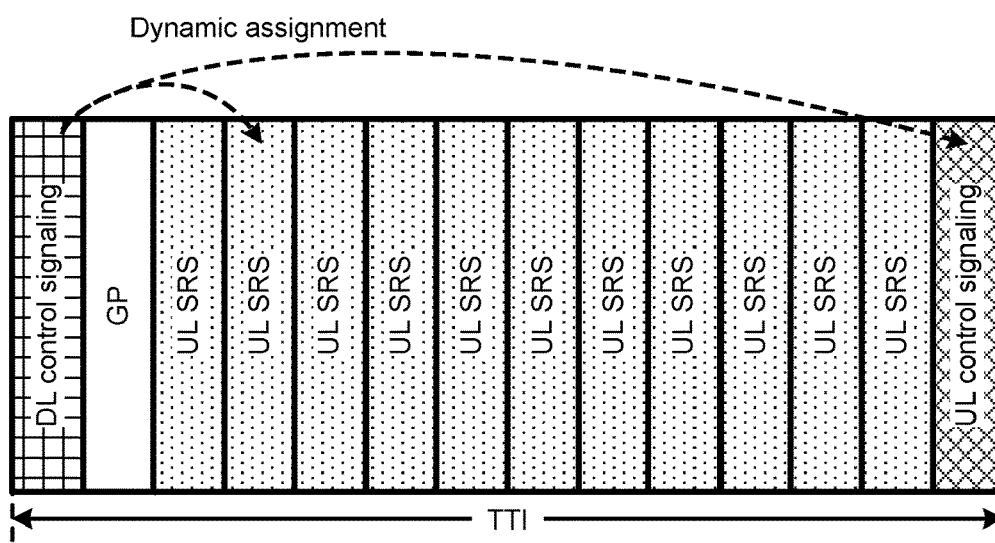

The TTI configuration illustrated as FIG. 9B can be used as a TTI configuration in which uplink sounding reference signals (an SRS: Sounding Reference Signal) are dynamically assigned. In this configuration, the first symbol of the TTI forms a downlink control signal interval, the second symbol forms a GP, the third to 13th symbols form an uplink SRS transmission interval, and the 14th symbol forms a feedback interval.

Figure 9C:
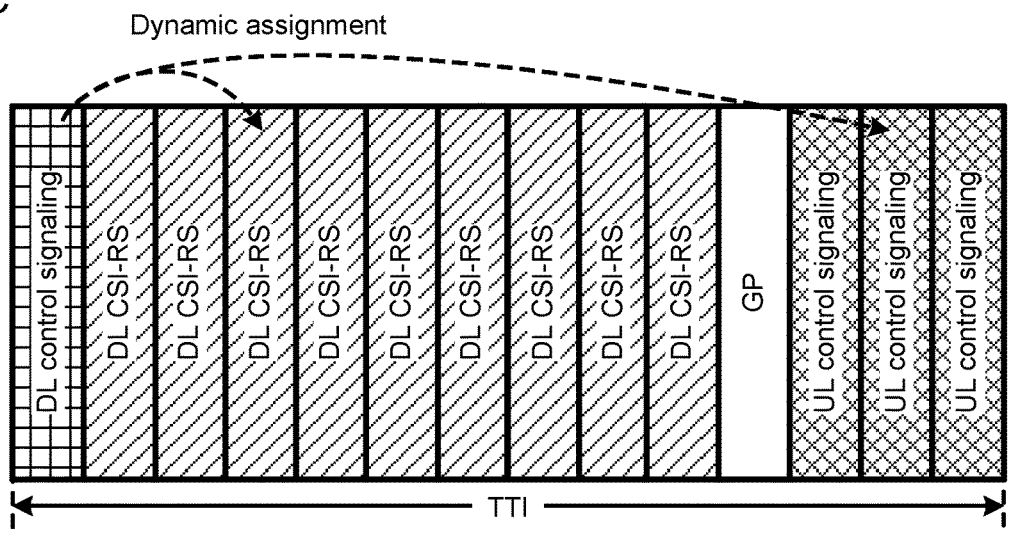

The TTI configuration illustrated as FIG. 9C can be used as a TTI configuration in which downlink sounding reference signals (e.g., a CSI-RS: Channel State Information Reference Signal) are dynamically assigned. In this configuration, the first symbol of the TTI forms a downlink control signal interval, the second to 10th symbols form a downlink CSI-RS transmission interval, the 11th symbol forms a GP, and the 12th to 14th symbols form a feedback interval. Thus, the UE can perform CSI measurement and reporting in one TTI (in a self-contained manner).

<Control of Radio Frame Configuration/TTI Configuration Based on Delay Capability>

In an embodiment of the present invention, the above-mentioned radio frame configurations and TTI configurations are controlled on the basis of capability information (delay capability) related to a supportable delay. The delay capability is information concerning at least one of, e.g., a supportable feedback delay, a processing delay, and a TTI length.

The feedback delay may be, e.g., the RTT (Round-Trip Time) between the eNB and the UE, the one-way transmission delay time from the UE to the eNB, or the one-way transmission delay time from the eNB to the UE. The eNB and/or the UE may obtain a supportable feedback delay as a preset value or as a value measured in an actual environment. The eNB and/or the UE may measure, e.g., the time from transmission of a predetermined signal until reception of a corresponding signal as the RTT.

The processing delay refers to the time taken for the eNB and/or the UE to perform predetermined processing. The eNB and/or the UE may obtain a supportable processing delay as a preset value or as a value measured in an actual environment.

The information concerning a TTI length may be, e.g., a supportable minimum TTI length determined in consideration of a processing delay or a feedback delay, or a maximum TTI length corresponding to the limit of time for the persistence of a delay.

The delay capability may be information concerning a combination of a supportable feedback delay, a processing delay, and the like, or may be information concerning another delay. The delay capability may be related to, e.g., a delay taken (or which may be taken) for the UE to transmit a predetermined uplink signal after reception of a predetermined downlink signal. More specifically, the delay capability may be information concerning a delay taken (or which may be taken) for the UE to transmit an uplink control signal after reception of a downlink data signal, or may be information concerning a delay taken (or which may be taken) for the UE to transmit an uplink data signal after reception of a downlink control signal.

The UE determines a delay which can be supported by itself, on the basis of, e.g., the surrounding environment (e.g., the radius of a serving cell (a cell used for communication)), communication parameters (e.g., the subcarrier interval and the symbol length), communication quality (e.g., the channel state), transmission/reception processing (e.g., details of processing such as demodulation and decoding and a throughput such as a high load/low load), and signals to be transmitted/received (e.g., the types of signals, channels used, and radio resources), and transmits a delay capability related to a delay which can be supported by itself to a network (e.g., the eNB).

The eNB schedules a UE on the basis of a delay capability notified from the UE. The eNB schedules a UE so as to, e.g., execute communication using a TTI configuration having a TTI length equal to or larger than a delay supported by the UE (or larger than the delay). In this case, the UE performs control to receive a certain downlink radio resource (e.g., a downlink control signal interval) and/or transmit a certain uplink radio resource (e.g., a feedback interval), in a time interval (TTI) equal to or larger than a delay indicated by the delay capability, on the basis of a downlink control signal notified from the eNB.

The eNB may determine a delay which can be supported by itself (a cell formed by itself), on the basis of, e.g., the surrounding environment, communication parameters, communication quality, transmission/reception processing, and signals to be transmitted/received, and transmit a delay capability related to a delay which can be supported by itself to the UE. The eNB may, for example, obtain the distance between itself and a certain UE on the basis of signals to be transmitted and received and geographical position information obtained by, e.g., the GPS (Global Positioning System), a gyro sensor, or a compass, and determine a delay capability supported for the UE.

In this case, the UE may select at least one of delay capabilities received from the eNB and report it to the eNB as a delay capability supported by itself. Thus, since the UE may not search and report unwanted delay capabilities which are not supported by the eNB (which are not used for the UE), the processing/communication overhead of the UE can be reduced.

Capabilities (Capability categories) employed under different conditions may be defined and transmitted as delay capabilities. For example, these delay capabilities may be transmitted assuming that delay capability 1 represents a delay capability when the UE performs normal reception processing (the amount of reception processing is small), and delay capability 2 represents a delay capability when the UE performs advanced reception processing (the amount of reception processing is large).

The capability category may be defined for each condition such as the surrounding environment (e.g., the radius of a serving cell), communication parameters (e.g., the symbol length), communication quality (e.g., the channel state), transmission/reception processing details (e.g., the amount of processing of signals to be transmitted and/or received, the demodulation scheme, and the cancellation scheme), and signals (channels) to be transmitted/received. The UE/eNB determines a condition under which each delay capability category is employed, and then determines a delay which can be supported by a partner device under the condition.

The delay capability may be associated with another user terminal capability information (UE Capability). For example, the delay capability may be joint-encoded with at least one of UE capability information (e.g., the transmission rate, the bandwidth, and the number of antennas) defined in existing LTE, and UE capability information (e.g., the stand-alone connection support and the power consumption mode) defined in the future LTE standard. In this case, another UE capability information associated with the delay capability, itself, can be construed as a delay capability (or information for specifying a delay capability).

For example, a certain UE category (e.g., UE category 1) may represent a transmission rate of 100 Mbps and a delay of 1 TTI, and another UE category (e.g., UE category 2) may represent a transmission rate of 1 Gbps and a delay of zero TTI (a self-contained TTI is used). In this case, a delay capability can be notified by notifying an index indicating a UE category.

With the above-described radio communication method according to an embodiment of the present invention, information concerning a supportable delay can be shared between the eNB and the UE by delay capability notification, thus allowing control to execute communication using an appropriate radio frame configuration/TTI configuration.

(Radio Communication System)

The configuration of a radio communication system according to an embodiment of the present invention will be described below. The radio communication system performs communication using the radio communication method according to any of the above-mentioned embodiments of the present invention or a combination thereof.

Figure 10:
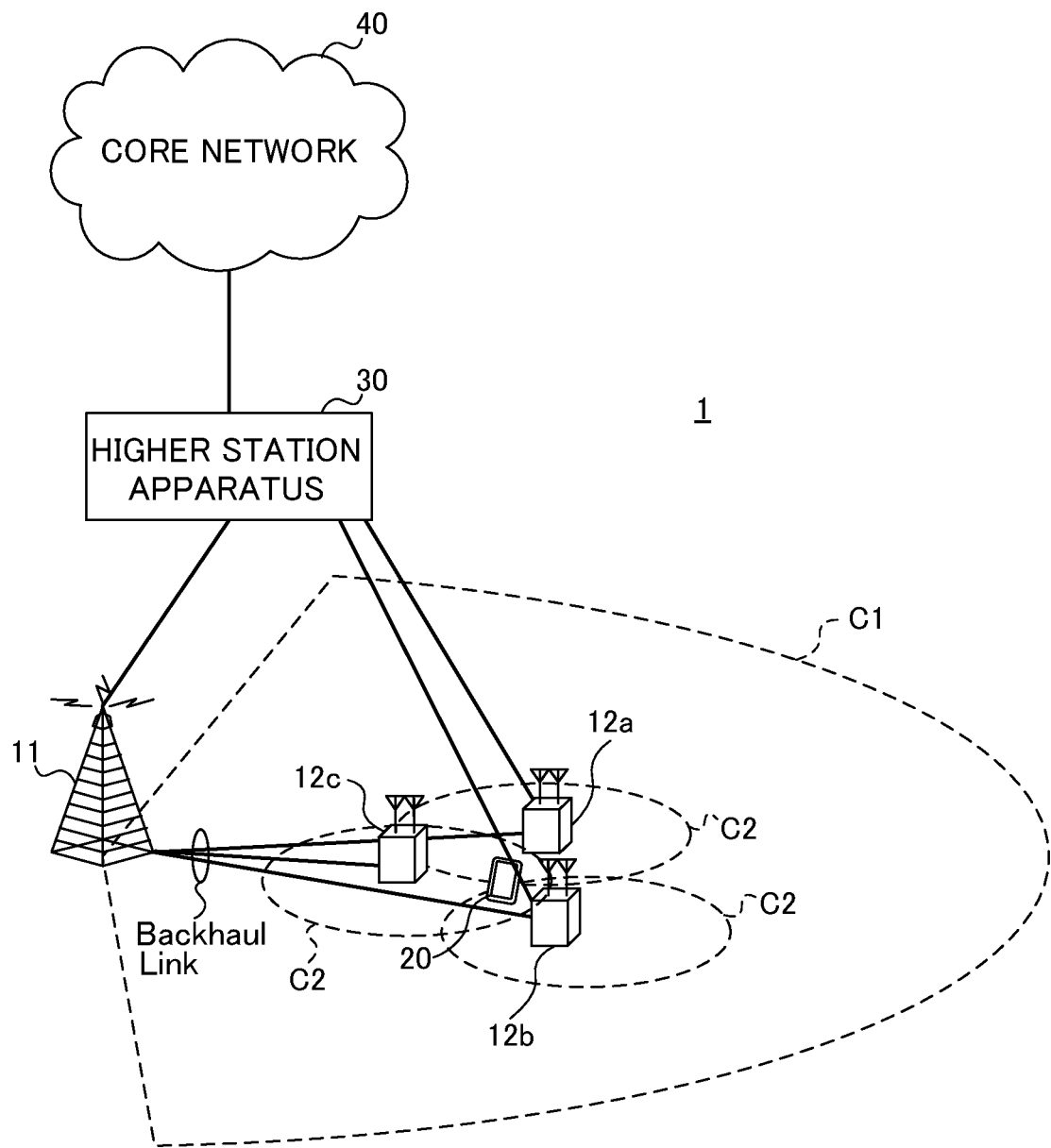
FIG. 10 is a diagram illustrating an exemplary schematic configuration of a radio communication system according to an embodiment of the present invention.

FIG. 10 is a diagram illustrating an exemplary schematic configuration of a radio communication system according to an embodiment of the present invention. In a radio communication system 1, CA (Carrier Aggregation) and/or DC (Dual Connectivity) which integrates fundamental frequency blocks (component carriers) with the system bandwidth (e.g., 20 MHz) of the LTE system as a unit is applicable.

The radio communication system 1 may be called, e.g., LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), or New-RAT (Radio Access Technology), or a system which implements these systems.

The radio communication system 1 depicted as FIG. 10 includes a radio base station 11 forming a macrocell C1 having a relatively wide coverage, and radio base stations 12 (12a to 12c) forming small cells C2 which are located in the macrocell C1 and more local than the macrocell C1. A user terminal 20 resides in the macrocell C1 and each small cell C2.

The user terminal 20 is connectable to both the radio base station 11 and the radio base stations 12. The user terminal 20 is expected to simultaneously use the macrocell C1 and the small cell C2 by CA or DC. The user terminal 20 may employ CA or DC using cells (CCs) (e.g., five or fewer CCs or six or more CCs).

The user terminal 20 and the radio base station 11 can communicate with each other using a carrier (the existing carrier called, e.g., Legacy carrier) having a narrow bandwidth in a relatively low frequency band (e.g., 2 GHz). The user terminal 20 and the radio base stations 12 may communicate with each other using a carrier having a wide bandwidth in a relatively high frequency band (e.g., 3.5 or 5 GHz) or using the same carrier as in communication with the radio base station 11. The configuration of the frequency band used by each radio base station is not limited to this.

Wired connection (e.g., an X2 interface or an optical fiber conforming to the CPRI (Common Public Radio Interface)) or radio connection may be established between the radio base station 11 and the radio base stations 12 (or between the two radio base stations 12).

The radio base station 11 and each radio base station 12 are respectively connected to a higher station apparatus 30 and further connected to a core network 40 via the higher station apparatus 30. Although the higher station apparatus 30 includes, e.g., an access gateway device, an RNC (Radio Network Controller), and an MME (Mobility Management Entity), the present invention is not limited to this. Each radio base station 12 may be connected to the higher station apparatus 30 via the radio base station 11.

The radio base station 11 has a relatively wide coverage and may be called, e.g., a macro base station, an aggregation node, an eNB (eNodeB), or a transmission and reception point. The radio base station 12 has a local coverage and may be called e.g., a small base station, a micro base station, a pico base station, a femto base station, an HeNB (Home eNodeB), an RRH (Remote Radio Head), or a transmission and reception point. The radio base stations 11 and 12 will be collectively referred to as radio base stations 10 hereinafter when no distinction is made between them.

Each user terminal 20 is compatible with various communication schemes such as LTE and LTE-A and may include not only mobile communication terminal (mobile station) but also fixed communication terminal (fixed station).

The radio communication system 1 uses as radio access schemes, OFDMA (Orthogonal Frequency Division Multiple Access) for downlinks and SC-FDMA (Single-Carrier Frequency Division Multiple Access) for uplinks.

OFDMA is a multicarrier transmission scheme for communication by dividing a frequency band into narrow frequency bands (subcarriers) and mapping data to each subcarrier. SC-FDMA is a single-carrier transmission scheme for dividing the system bandwidth into bands including one or continuous resource block for each terminal, and allowing these terminals to use different bands, thus alleviating inter-terminal interference. The uplink and downlink radio access schemes are not limited to such a combination, and other radio access schemes may be used.

The radio communication system 1 uses, e.g., a PDSCH (Physical Downlink Shared Channel) shared by each user terminal 20, a PBCH (Physical Broadcast Channel), and a downlink L1/L2 control channel as downlink channels. The PDSCH is used to transmit, e.g., user data, upper layer control information, and an SIB (System Information Block). The PBCH is used to transmit an MIB (Master Information Block).

The downlink L1/L2 control channel includes, e.g., a PDCCH (Physical Downlink Control Channel), an EPDCCH (Enhanced Physical Downlink Control Channel), a PCFICH (Physical Control Format Indicator Channel), and a PHICH (Physical Hybrid-ARQ Indicator Channel). The PDCCH is used to transmit, e.g. DCI (Downlink Control Information) including scheduling information of PDSCHs and PUSCHs. The PCFICH is used to transmit the number of OFDM symbols used in the PDCCH. The PHICH is used to transmit HARQ (Hybrid Automatic Repeat reQuest) delivery acknowledgement information (which may also be referred to as, e.g., retransmission control information, HARQ-ACK, or ACK/NACK) for the PUSCH. The EPDCCH is frequency-division-multiplexed with the PDSCH (downlink shared data channel) and used to transmit, e.g., DCI, like the PDCCH.

The radio communication system 1 uses, e.g., a PUSCH (Physical Uplink Shared Channel) shared by each user terminal 20, a PUCCH (Physical Uplink Control Channel), and a PRACH (Physical Random Access Channel) as uplink channels. The PUSCH is used to transmit user data and upper layer control information. The PUCCH is used to transmit, e.g., downlink radio quality information (CQI: Channel Quality Indicator) and delivery acknowledgement information. The PRACH is used to transmit a random access preamble for establishing connection with a cell.

The radio communication system 1 transmits, e.g., a CRS (Cell-specific Reference signal), a CSI-RS (Channel State Information-Reference Signal), a DMRS (DeModulation Reference Signal), and a PRS (Positioning Reference Signal) as downlink reference signals. The radio communication system 1 further transmits, e.g., an SRS (Sounding Reference Signal) and a DMRS (DeModulation Reference Signal) as uplink reference signals. The DMRS may also be referred to as a user terminal-specific reference signal (UE-specific reference signal). The reference signals to be transmitted are not limited to these examples.

(Radio Base Station)

Figure 11:
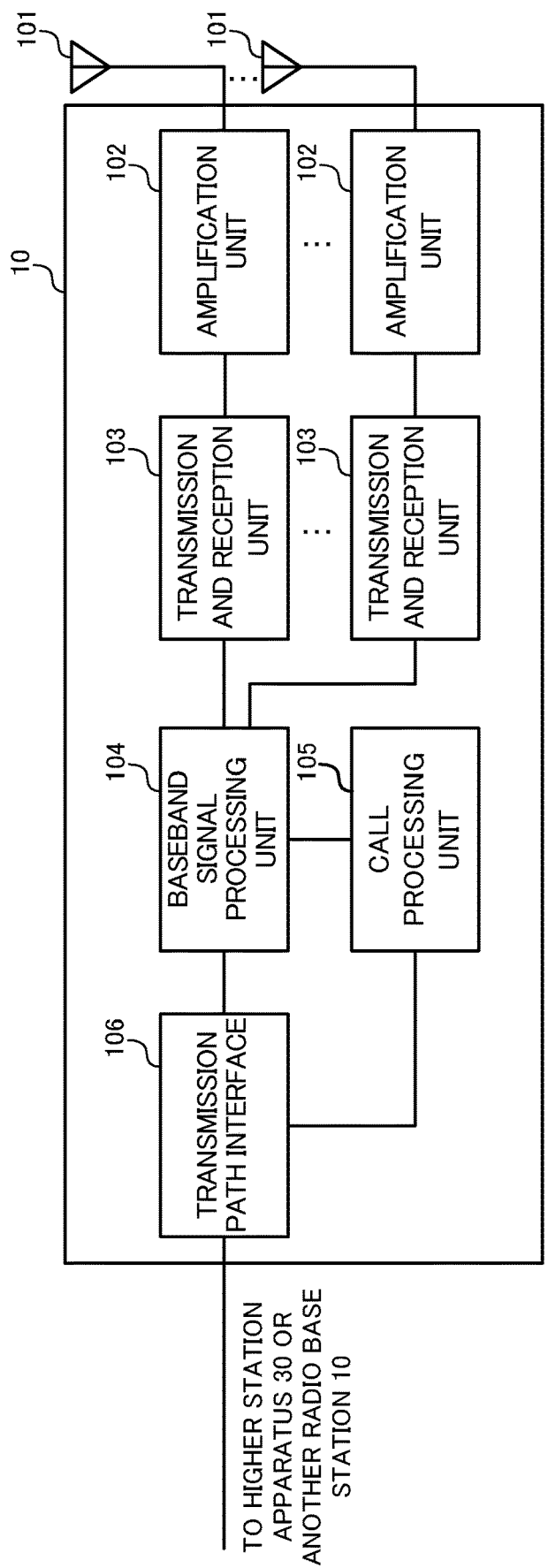
FIG. 11 is a diagram illustrating an exemplary configuration of an entire radio base station according to an embodiment of the present invention.

FIG. 11 is a diagram illustrating an exemplary configuration of an entire radio base station according to an embodiment of the present invention. The radio base station 10 includes transmission and reception antennas 101, amplification units 102, transmission and reception units 103, a baseband signal processing unit 104, a call processing unit 105, and a transmission path interface 106. It suffices to include at least one transmission and reception antenna 101, at least one amplification unit 102, and at least one transmission and reception unit 103.

User data transmitted from the radio base station 10 to the user terminal 20 by a downlink is input from the higher station apparatus 30 to the baseband signal processing unit 104 via the transmission path interface 106.

The baseband signal processing unit 104 performs transmission processing for the user data, such as PDCP (Packet Data Convergence Protocol) layer processing, user data division and coupling, RLC (Radio Link Control) layer transmission processing such as RLC retransmission control, MAC (Medium Access Control) retransmission control (e.g., HARQ transmission processing), scheduling, transport format selection, channel encoding, IFFT (Inverse Fast Fourier Transform) processing, and precoding processing, and transfers the user data to the transmission and reception units 103. Transmission processing such as channel encoding and IFFT is also performed for downlink control signals, which are then transferred to the transmission and reception units 103.

The transmission and reception unit 103 converts a baseband signal precoded and output from the baseband signal processing unit 104 for each antenna into a radio frequency band and transmits it. Radio frequency signals after frequency conversion by the transmission and reception units 103 are amplified by the amplification units 102 and transmitted from the transmission and reception antennas 101. The transmission and reception unit 103 may be implemented as a transmitter/receiver, a transmission and reception circuit, or a transmission and reception device described on the basis of a common understanding in the technical field according to the present invention. The transmission and reception unit 103 may serve as an integrated transmission and reception unit or include a transmission unit and reception unit.

As for uplink signals, a radio frequency signal received by the transmission and reception antenna 101 is amplified by the amplification unit 102. The transmission and reception unit 103 receives the uplink signal amplified by the amplification unit 102. The transmission and reception unit 103 performs frequency conversion of the received signal into a baseband signal and outputs it to the baseband signal processing unit 104.

The baseband signal processing unit 104 performs FFT (Fast Fourier Transform) processing, IDFT (Inverse Discrete Fourier Transform) processing, error correction decoding, MAC retransmission control reception processing, and RLC layer and PDCP layer reception processing, for user data contained in input uplink signals, and transfers the user data to the higher station apparatus 30 via the transmission path interface 106. The call processing unit 105 performs call processing such as communication channel setup and release, state management of the radio base station 10, and radio resource management.

The transmission path interface 106 exchanges signals with the higher station apparatus 30 via a predetermined interface. The transmission path interface 106 may exchange signals with another radio base station 10 (backhaul signaling) via an interface between base stations (e.g., an X2 interface or an optical fiber conforming to the CPRI (Common Public Radio Interface)). The transmission path interface 106 can transmit and receive, e.g., information transmitted from the user terminal 20, information transmitted to the user terminal 20, and information held (generated) by the radio base station 10.

The transmission and reception unit 103 may transmit, e.g., information concerning a delay capability and information concerning a self-contained TTI configuration to the user terminal 20. The transmission and reception unit 103 may receive information concerning a delay capability from the user terminal 20.

The transmission and reception unit 103 transmits downlink control information concerning transmission and/or reception of predetermined signals (e.g., data signals and feedback information) to the user terminal 20 in the downlink control signal interval determined by a control unit 301. The transmission and reception unit 103 may transmit, e.g., instruction information (DL grant) for receiving a PDSCH (Physical Downlink Shared Channel) in the data interval. The transmission and reception unit 103 may further transmit instruction information (UL grant) for transmitting a PUSCH (Physical Uplink Shared Channel) in the data interval.

Figure 12:
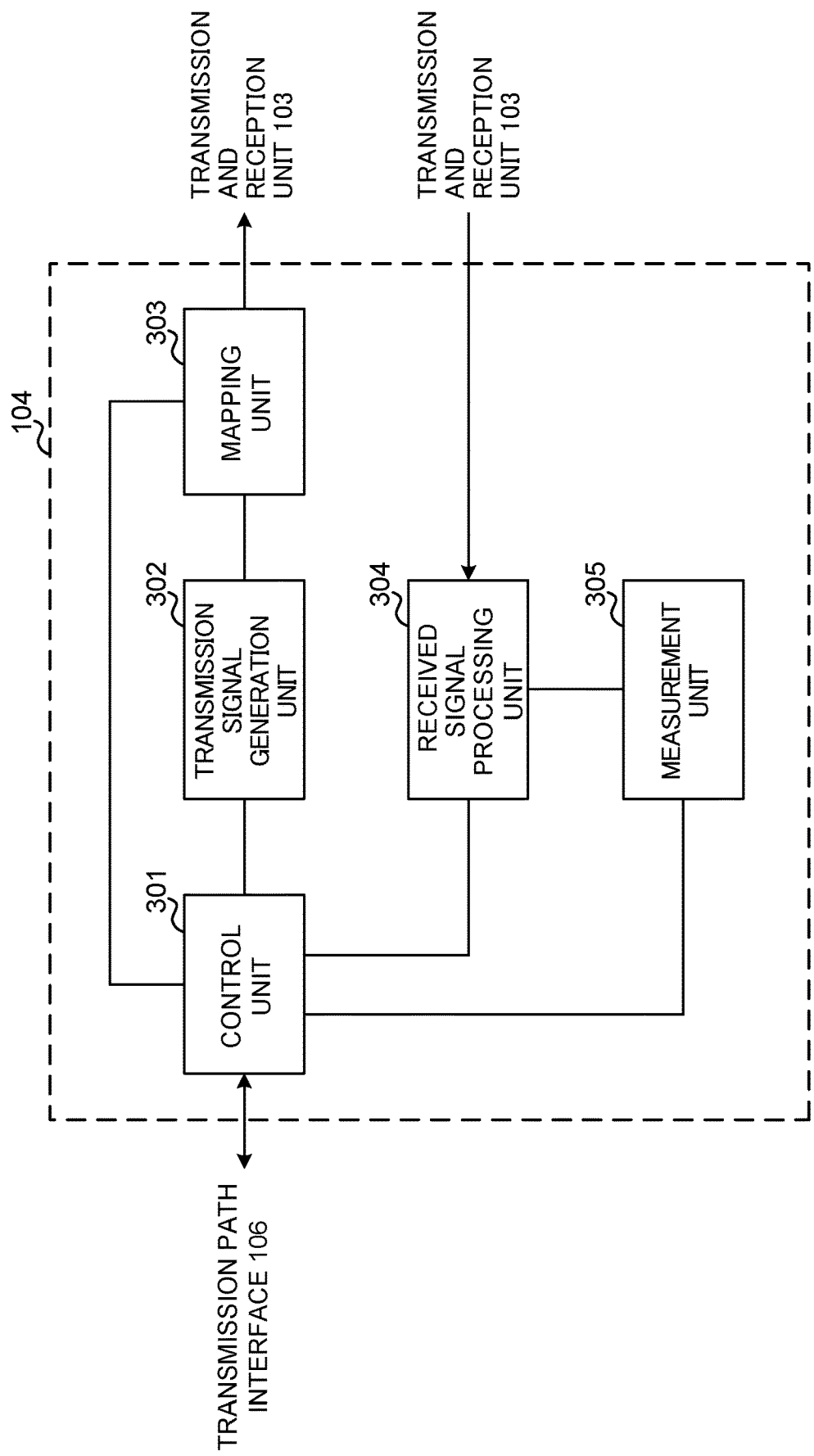
FIG. 12 is a diagram illustrating an exemplary functional configuration of a radio base station according to an embodiment of the present invention.

FIG. 12 is a diagram illustrating an exemplary functional configuration of a radio base station according to an embodiment of the present invention. FIG. 12 mainly illustrates functional blocks of feature portions in the present embodiment and the radio base station 10 also includes other functional blocks involved in radio communication. The baseband signal processing unit 104 includes at least a control unit (scheduler) 301, a transmission signal generation unit 302, a mapping unit 303, a received signal processing unit 304, and a measurement unit 305, as illustrated as FIG. 12.

The control unit (scheduler) 301 controls the overall radio base station 10. The control unit 301 may be implemented as a controller, a control circuit, or a control device described on the basis of a common understanding in the technical field according to the present invention.

The control unit 301 controls, e.g., signal generation by the transmission signal generation unit 302 and signal allocation by the mapping unit 303. The control unit 301 further controls signal reception processing by the received signal processing unit 304 and signal measurement by the measurement unit 305.

The control unit (scheduler) 301 controls scheduling (e.g., resource assignment) of system information, downlink data signals transmitted by PDSCHs, and downlink control signals transmitted by PDCCHs and/or EPDCCHs. The control unit 301 further controls generation of downlink control signals (e.g., delivery acknowledgement information) and downlink data signals on the basis of, e.g., the result of determination as to whether retransmission control may be preferably performed for uplink data signals. The control unit 301 even controls scheduling of sync signals (e.g., a PSS (Primary Synchronization Signal)/SSS (Secondary Synchronization Signal)) and downlink reference signals such as a CRS, a CSI-RS, and a DMRS.

The control unit 301 controls scheduling of, e.g., uplink data signals transmitted by PUSCHs, uplink control signals (e.g., delivery acknowledgement information) transmitted by PUCCHs and/or PUSCHs, random access preambles transmitted by PRACHs, and uplink reference signals.

The control unit 301 performs control to determine a delay which can be supported by the radio base station 10 and/or the user terminal 20, on the basis of at least one of, e.g., the surrounding environment, communication parameters, communication quality, transmission/reception processing details, and signals to be transmitted/received, and transmit information concerning a delay capability related to the delay that can be supported by the radio base station 10 and/or the user terminal 20 to the user terminal 20.

The control unit 301 may perform the above-mentioned determination on the basis of, e.g., information (e.g., HARQ-ACK or channel state information) fed back to the user terminal 20, feedback information (e.g., HARQ-ACK or channel state information) from the user terminal 20, information notified from another radio base station 10, or the measurement result obtained by the measurement unit 305.

When the control unit 301 obtains from the received signal processing unit 304, information concerning a delay capability notified from the user terminal 20, it can control the radio frame configuration and/or the TTI configuration used by the user terminal 20 and scheduling of the user terminal 20, on the basis of the delay capability.

The information concerning a delay capability may be information (e.g., information concerning at least one of a supportable feedback delay, processing delay, and TTI length) which allows direct specification of a delay capability, or may be information (e.g., another UE capability information or UE category (UE category index)) which allows indirect specification of a delay capability.

The information concerning a delay capability may include a plurality of types of information defined in accordance with the conditions. The delay capability corresponding to each condition may be referred to as a delay capability belonging to a capability category. Information concerning the category (e.g., information for specifying a condition corresponding to the category) may be notified from the radio base station 10 to the user terminal 20.

The control unit 301 performs control to execute communication based on a TTI length equal to or larger than a delay value specified in the transmitted and/or received information concerning a delay capability. The control unit 301, for example, controls transmission and/or reception for each TTI (or each symbol), on the basis of a self-contained TTI configuration including the interval (downlink control signal interval) in which downlink control information is transmitted and/or received, the interval (data interval) in which data is transmitted and/or received, and the interval (feedback interval) in which feedback information is transmitted and/or received.

In this case, the control unit 301 performs control to incorporate information concerning a self-contained TTI configuration (e.g., information concerning the interval length and information concerning signal transmission and/or reception processing) into downlink control information to be transmitted in the downlink control signal interval. In other words, the control unit 301 generates downlink control information to be transmitted in the downlink control signal interval, on the basis of the transmitted and/or received information concerning a delay capability.

The respective intervals may be set temporally contiguous to each other (the next interval starts immediately after the preceding interval), or non-transmission intervals (which may also be referred to as, e.g., non-reception intervals, guard intervals, or GPs) may be additionally defined between the respective intervals.

The control unit 301 may further perform control to generate various types of information such as information concerning a self-contained TTI configuration and notify them to the user terminal 20 using upper layer signaling (e.g., RRC signaling or broadcast information (an MIB or an SIB)), downlink control information (e.g., DCI), or a combination thereof.

The transmission signal generation unit 302 generates a downlink signal (e.g., a downlink control signal, a downlink data signal, or a downlink reference signal) on the basis of an instruction from the control unit 301 and outputs it to the mapping unit 303. The transmission signal generation unit 302 may be implemented as a signal generator, a signal generation circuit, or a signal generation device described on the basis of a common understanding in the technical field according to the present invention.

The transmission signal generation unit 302 generates, e.g., a DL assignment for notifying downlink signal assignment information and a UL grant for notifying uplink signal assignment information, on the basis of instructions from the control unit 301. The downlink data signal is encoded and modulated in accordance with, e.g., an encoding ratio and modulation scheme determined on the basis of, e.g., CSI (Channel State Information) from each user terminal 20.

The mapping unit 303 maps the downlink signal generated by the transmission signal generation unit 302 to a predetermined radio resource on the basis of an instruction from the control unit 301 and outputs it to the transmission and reception unit 103. The mapping unit 303 may be implemented as a mapper, a mapping circuit, or a mapping device described on the basis of a common understanding in the technical field according to the present invention.

The received signal processing unit 304 performs reception processing (e.g., demapping, demodulation, and decoding) for received signals input from the transmission and reception unit 103. Examples of the received signals include uplink signals (e.g., an uplink control signal, an uplink data signal, and an uplink reference signal) transmitted from the user terminal 20. The received signal processing unit 304 may be implemented as a signal processor, a signal processing circuit, or a signal processing device described on the basis of a common understanding in the technical field according to the present invention.

The received signal processing unit 304 outputs information decoded by the reception processing to the control unit 301. When, for example, a PUCCH including HARQ-ACK is received, the HARQ-ACK is output to the control unit 301. The received signal processing unit 304 outputs received signals and signals after reception processing to the measurement unit 305.

The measurement unit 305 measures the received signals. The measurement unit 305 may be implemented as a gauge, a measurement circuit, or a measurement device described on the basis of a common understanding in the technical field according to the present invention.

The measurement unit 305 may measure, e.g., the received power (e.g., the RSRP (Reference Signal Received Power)), the reception quality (e.g., the RSRQ (Reference Signal Received Quality)), and the channel state of the received signals. The measurement results may be output to the control unit 301.

(User Terminal)

Figure 13:
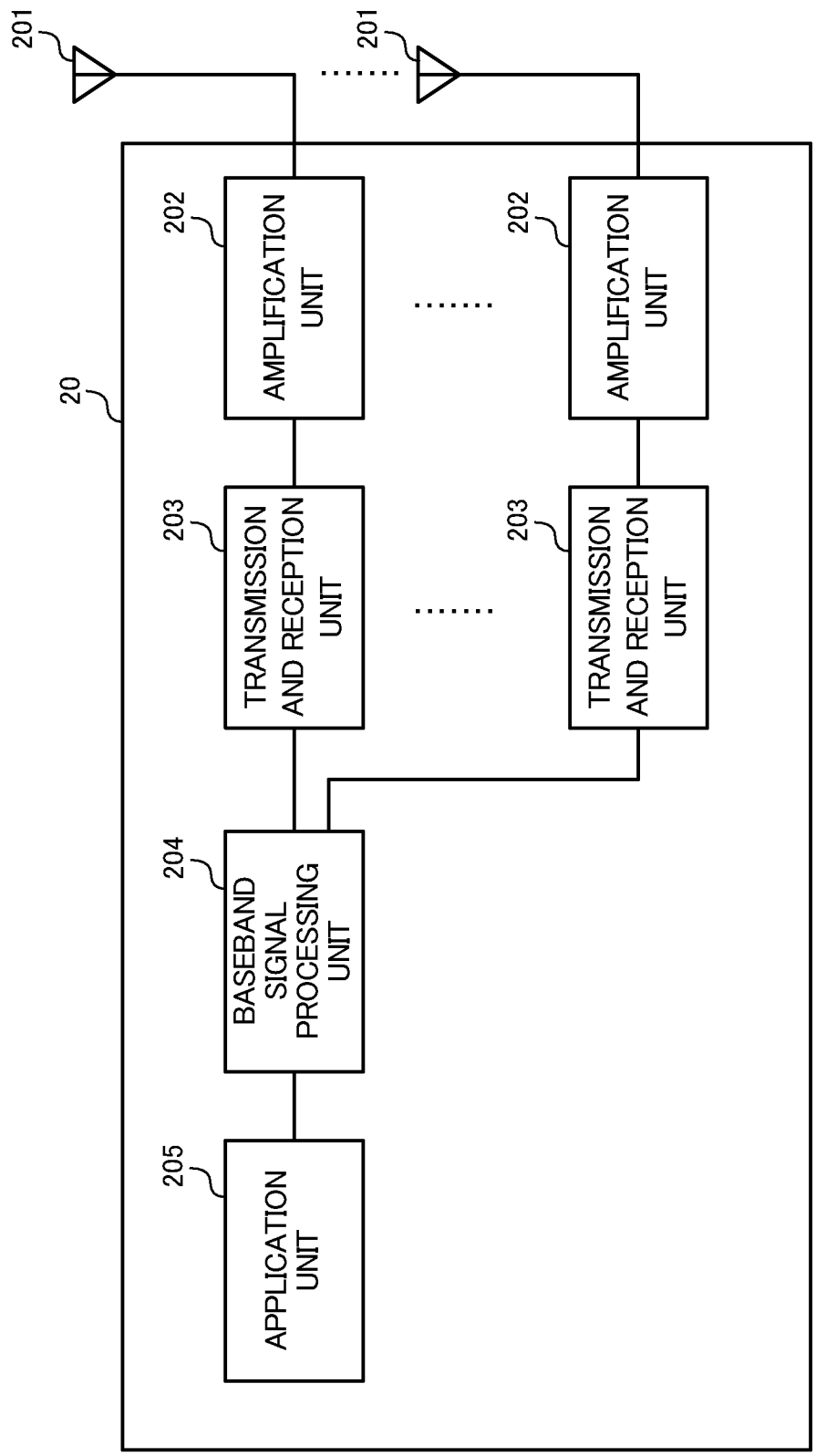
FIG. 13 is a diagram illustrating an exemplary configuration of an entire user terminal according to an embodiment of the present invention.

FIG. 13 is a diagram illustrating an exemplary configuration of an entire user terminal according to an embodiment of the present invention. The user terminal 20 includes transmission and reception antennas 201, amplification units 202, transmission and reception units 203, a baseband signal processing unit 204, and an application unit 205. It suffices to include at least one transmission and reception antenna 201, at least one amplification unit 202, and at least one transmission and reception unit 203.

A radio frequency signal received by the transmission and reception antenna 201 is amplified by the amplification unit 202. The transmission and reception unit 203 receives a downlink signal amplified by the amplification unit 202. The transmission and reception unit 203 performs frequency conversion of the received signal into a baseband signal and outputs it to the baseband signal processing unit 204. The transmission and reception unit 203 may be implemented as a transmitter/receiver, a transmission and reception circuit, or a transmission and reception device described on the basis of a common understanding in the technical field according to the present invention. The transmission and reception unit 203 may serve as an integrated transmission and reception unit or include a transmission unit and reception unit.

The baseband signal processing unit 204 performs, e.g., FFT processing, error correction decoding, and retransmission control reception processing for an input baseband signal. User data on a downlink is transferred to the application unit 205. The application unit 205 performs, e.g., processing associated with layers above a physical layer and a MAC layer. Broadcast information of the data on a downlink is also transferred to the application unit 205.

User data on an uplink is input from the application unit 205 to the baseband signal processing unit 204. The baseband signal processing unit 204 performs, e.g., retransmission control transmission processing (e.g., HARQ transmission processing), channel encoding, precoding, DFT (Discrete Fourier Transform) processing, and IFFT processing and transfers a baseband signal to the transmission and reception unit 203. The transmission and reception unit 203 converts the baseband signal output from the baseband signal processing unit 204 into a radio frequency band and transmits it. The radio frequency signal after frequency conversion by the transmission and reception unit 203 is amplified by the amplification unit 202 and transmitted from the transmission and reception antenna 201.

The transmission and reception unit 203 may receive, e.g., information concerning a delay capability and information concerning a self-contained TTI configuration from the radio base station 10. The transmission and reception unit 203 may transmit information concerning a delay capability to the radio base station 10.

The transmission and reception unit 203 receives downlink control information concerning transmission and/or reception of predetermined signals (e.g., data signals and feedback information) from the radio base station 10 in the downlink control signal interval determined by a control unit 401.

Figure 14:
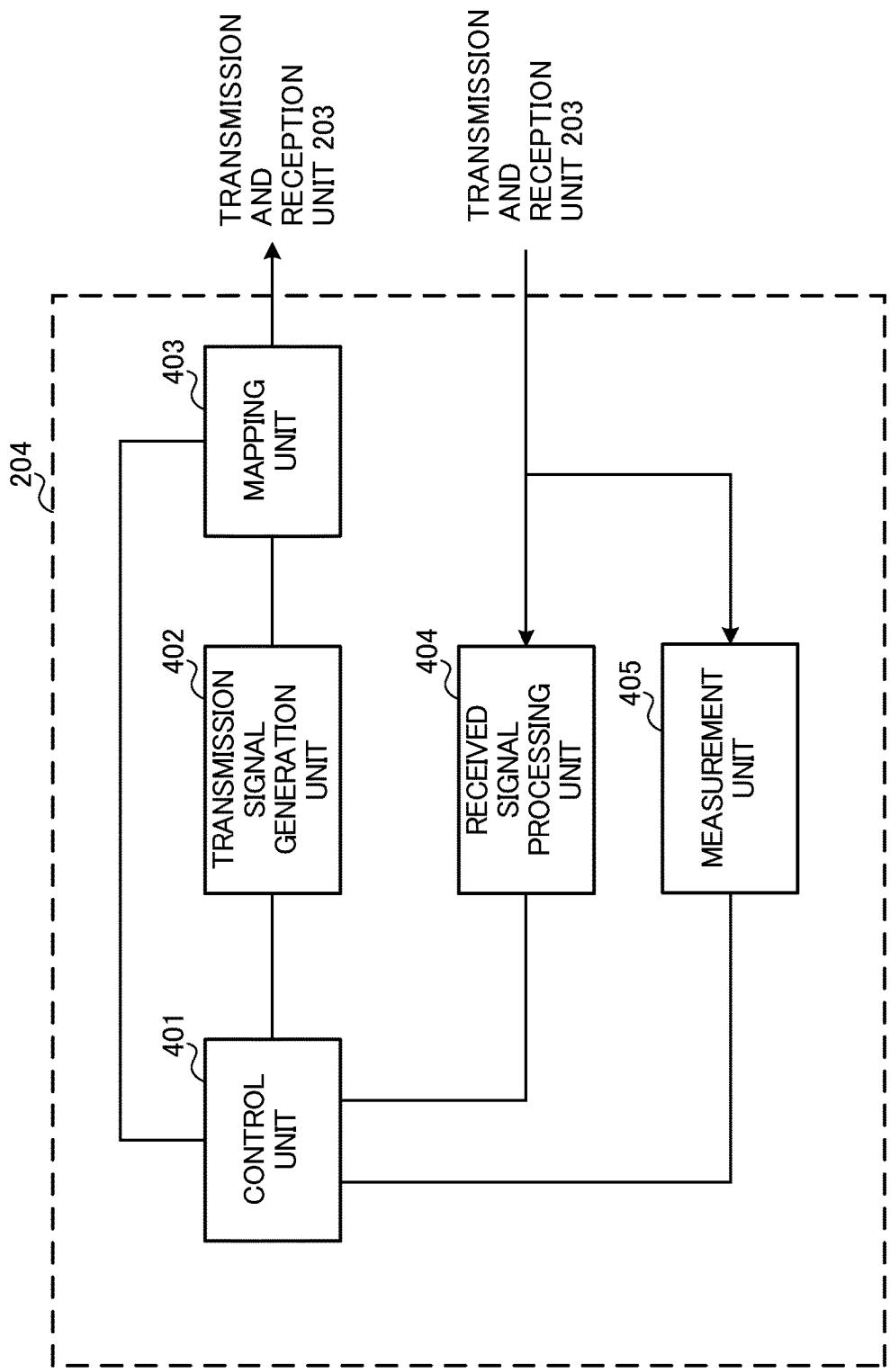
FIG. 14 is a diagram illustrating an exemplary functional configuration of a user terminal according to an embodiment of the present invention.

FIG. 14 is a diagram illustrating an exemplary functional configuration of a user terminal according to an embodiment of the present invention. FIG. 14 mainly illustrates functional blocks of feature portions in the present embodiment and the user terminal 20 also includes other functional blocks involved in radio communication. The baseband signal processing unit 204 of the user terminal 20 includes at least a control unit 401, a transmission signal generation unit 402, a mapping unit 403, a received signal processing unit 404, and a measurement unit 405, as illustrated as FIG. 14.

The control unit 401 controls the overall user terminal 20. The control unit 401 may be implemented as a controller, a control circuit, or a control device described on the basis of a common understanding in the technical field according to the present invention.

The control unit 401 controls, e.g., signal generation by the transmission signal generation unit 402 and signal allocation by the mapping unit 403. The control unit 401 further controls signal reception processing by the received signal processing unit 404 and signal measurement by the measurement unit 405.

The control unit 401 obtains from the received signal processing unit 404, downlink control signals (signals transmitted by PDCCHs/EPDCHs) and downlink data signals (signals transmitted by PDSCHs) transmitted from the radio base station 10. The control unit 401 controls generation of uplink control signals (e.g., delivery acknowledgement information) and uplink data signals on the basis of, e.g., downlink control signals and the result of determination as to whether retransmission control may be preferably performed for downlink data signals.

The control unit 401 performs control to determine a delay which can be supported by the user terminal 20, on the basis of at least one of, e.g., the surrounding environment, communication parameters, communication quality, transmission/reception processing details, and signals to be transmitted/received, and transmit information concerning a delay capability related to the delay that can be supported by the user terminal 20 to the radio base station 10.

When the control unit 401 obtains from the received signal processing unit 404, information concerning a delay capability notified from the radio base station 10, it may perform control to determine information concerning a predetermined delay capability on the basis of the delay capability and transmit it to the radio base station 10.

The control unit 401 performs control to execute communication based on a TTI length equal to or larger than a delay value specified in the transmitted and/or received information concerning a delay capability (communication using a TTI having the TTI length). The control unit 401, for example, controls transmission and/or reception for each TTI (or each symbol), on the basis of a self-contained TTI configuration including the interval (downlink control signal interval) in which downlink control information is transmitted and/or received, the interval (data interval) in which data is transmitted and/or received, and the interval (feedback interval) in which feedback information is transmitted and/or received.

In this case, the control unit 401 may control transmission and reception processing in the data interval and/or the feedback interval on the basis of downlink control information (including information concerning a self-contained TTI configuration) received in the downlink control signal interval. The control unit 401 can perform control to determine the length of each interval for each TTI and execute communication corresponding to each interval.

When the control unit 401 obtains various types of information such as information concerning a self-contained TTI configuration from the received signal processing unit 404, it may update parameters used for control, on the basis of these pieces of information.

The transmission signal generation unit 402 generates an uplink signal (e.g., an uplink control signal, an uplink data signal, or an uplink reference signal) on the basis of an instruction from the control unit 401 and outputs it to the mapping unit 403. The transmission signal generation unit 402 may be implemented as a signal generator, a signal generation circuit, or a signal generation device described on the basis of a common understanding in the technical field according to the present invention.

The transmission signal generation unit 402 generates, e.g., an uplink control signal related to delivery acknowledgement information or CSI (Channel State Information) on the basis of an instruction from the control unit 401. The transmission signal generation unit 402 further generates an uplink data signal on the basis of an instruction from the control unit 401. When, for example, a UL grant is included in the downlink control signal notified from the radio base station 10, the transmission signal generation unit 402 is instructed to generate an uplink data signal by the control unit 401.

The mapping unit 403 maps the uplink signal generated by the transmission signal generation unit 402 to a radio resource on the basis of an instruction from the control unit 401 and outputs it to the transmission and reception unit 203. The mapping unit 403 may be implemented as a mapper, a mapping circuit, or a mapping device described on the basis of a common understanding in the technical field according to the present invention.

The received signal processing unit 404 performs reception processing (e.g., demapping, demodulation, and decoding) for received signals input from the transmission and reception unit 203. Examples of the received signals include downlink signals (e.g., a downlink control signal, a downlink data signal, and a downlink reference signal) transmitted from the radio base station 10. The received signal processing unit 404 may be implemented as a signal processor, a signal processing circuit, or a signal processing device described on the basis of a common understanding in the technical field according to the present invention. The received signal processing unit 404 may implement a reception unit according to the present invention.

The received signal processing unit 404 performs blind decoding of DCI (DCI format) for scheduling data (TB: Transport Block) transmission and/or reception on the basis of an instruction from the control unit 401. The received signal processing unit 404 may be configured to perform blind decoding of, e.g., a radio resource which varies on the basis of whether a self-contained TTI is used.

The received signal processing unit 404 outputs information decoded by the reception processing to the control unit 401. The received signal processing unit 404 outputs, e.g., broadcast information, system information, RRC signaling, and DCI to the control unit 401. The received signal processing unit 404 may output the data decoding result to the control unit 401. The received signal processing unit 404 outputs received signals and signals after reception processing to the measurement unit 405.

The measurement unit 405 measures the received signals. The measurement unit 405 may be implemented as a gauge, a measurement circuit, or a measurement device described on the basis of a common understanding in the technical field according to the present invention.

The measurement unit 405 may measure, e.g., the received power (e.g., the RSRP), the reception quality (e.g., the RSRQ), and the channel state of the received signals. The measurement results may be output to the control unit 401.

(Hardware Configuration)

The block diagrams used to describe the above-described embodiment represent blocks of functional units. These functional blocks (constituent units) are implemented in any combination of hardware and/or software. The means for implementing each functional block is not particularly limited. In other words, each functional block may be implemented as one physically coupled device or implemented by at least two physically separate devices connected in a wired or wireless manner.

Figure 15:
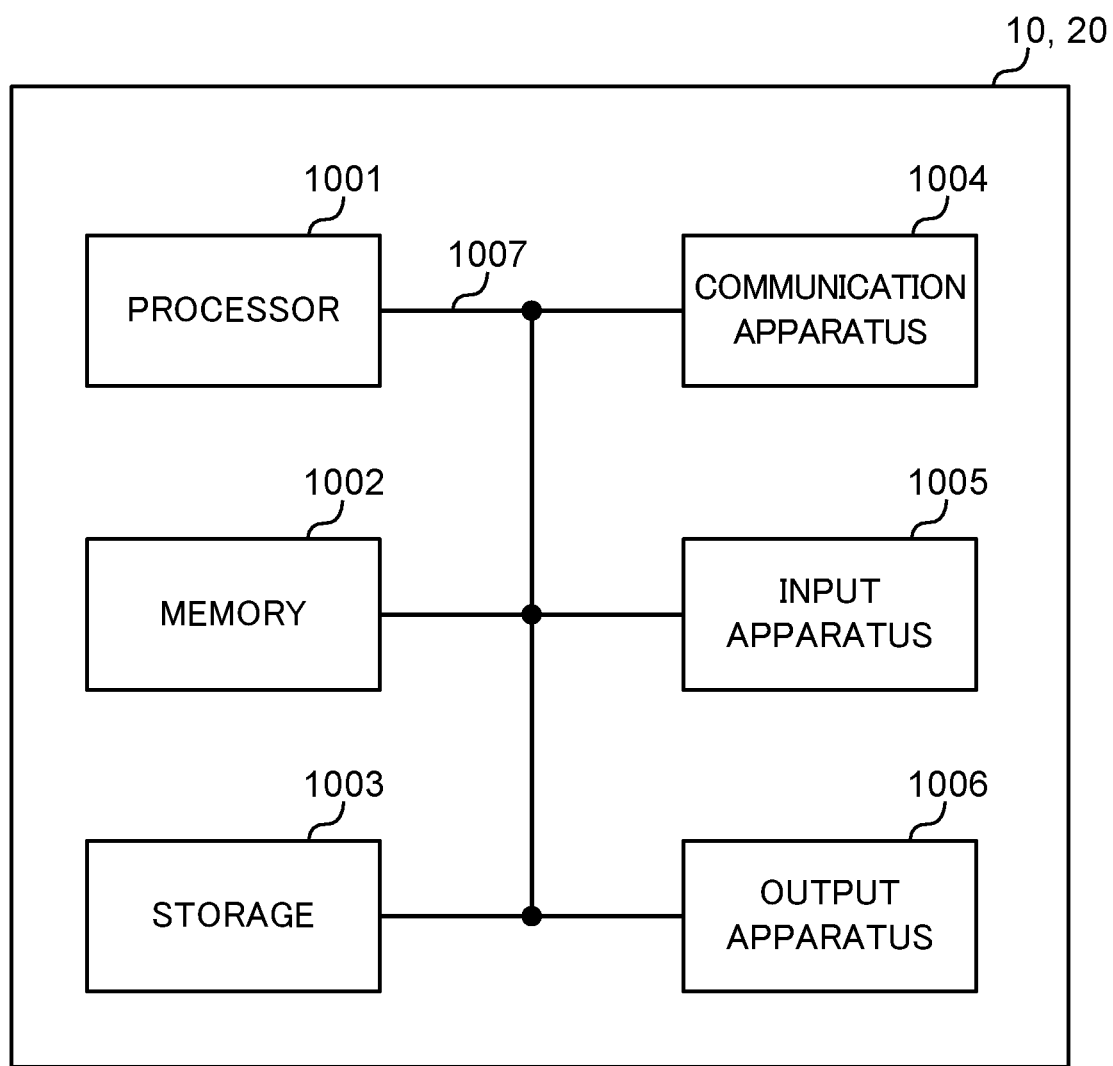
FIG. 15 is a diagram illustrating an exemplary hardware configuration of a radio base station and a user terminal according to an embodiment of the present invention.

A radio base station, a user terminal, and the like according to an embodiment of the present invention may serve as computers which perform the processes of a radio communication method according to the present invention. FIG. 15 is a diagram illustrating an exemplary hardware configuration of a radio base station and a user terminal according to an embodiment of the present invention. The above-mentioned radio base station 10 and user terminal 20 may be physically implemented as a computer apparatus including, e.g., a processor 1001, a memory 1002, a storage 1003, a communication apparatus 1004, an input apparatus 1005, an output apparatus 1006, and a bus 1007.

In the following description, the word "apparatus" may be read as a circuit, a device, a unit, or the like. The hardware configuration of the radio base station 10 and the user terminal 20 may include one or more apparatuses illustrated in the drawings or may not include some of the apparatuses.

Each function of the radio base station 10 and the user terminal 20 is implemented by reading predetermined software (program) onto hardware such as the processor 1001 or the memory 1002 to perform arithmetic operations using the processor 1001, and controlling communication using the communication apparatus 1004 and data read and/or write in the memory 1002 and the storage 1003.

The processor 1001, for example, controls the overall computer by running the operating system. The processor 1001 may be implemented as a CPU (Central Processing Unit) including, e.g., an interface with a peripheral apparatus, a control apparatus, an arithmetic apparatus, and a register. The above-mentioned baseband signal processing unit 104 (204) and the call processing unit 105, for example, may be implemented in the processor 1001.

The processor 1001 reads out a program (program code), a software module, and data from the storage 1003 and/or the communication apparatus 1004 to the memory 1002 and performs various processes in accordance with them. As the program, a program for causing the computer to execute at least some of the operations described in the above embodiment is used. The control unit 401 of the user terminal 20, for example, may be implemented as a control program stored in the memory 1002 and running on the processor 1001, and the remaining functional blocks may be implemented similarly.

The memory 1002 serves as a computer-readable recording medium and may be implemented as at least one of, e.g., a ROM (Read Only Memory), an EPROM (Erasable Programmable ROM), and a RAM (Random Access Memory). The memory 1002 may also be called, e.g., a register, a cache, or a main memory (main storage device). The memory 1002 may store, e.g., a software module and a program (program code) which can be executed to carry out a radio communication method according to an embodiment of the present invention.

The storage 1003 serves as a computer-readable recording medium and may be implemented as at least one of, e.g., an optical disk such as a CD-ROM (Compact Disc-ROM), a hard disk drive, a flexible disk, a magnetooptical disk, and a flash memory. The storage 1003 may also be referred to as an auxiliary storage apparatus.

The communication apparatus 1004 serves as hardware (transmission and reception device) for communication between computers via a wired and/or wireless network, and may also be referred to as, e.g., a network device, a network controller, a network card, or a communication module. The above-mentioned transmission and reception antenna 101 (201), the amplification unit 102 (202), the transmission and reception unit 103 (203), and the transmission path interface 106, for example, may be implemented in the communication apparatus 1004.

The input apparatus 1005 serves as an input device (e.g., a keyboard or a mouse) which receives input from the outside. The output apparatus 1006 serves as an output device (e.g., a display or a speaker) which outputs to the outside. The input apparatus 1005 and the output apparatus 1006 may form an integrated configuration (e.g., a touch panel).

The apparatuses such as the processor 1001 and the memory 1002 are connected to each other via the bus 1007 for information communication. The bus 1007 may be implemented as a single bus or different buses between the apparatuses.

The radio base station 10 and the user terminal 20 may include hardware such as a microprocessor, a DSP (Digital Signal Processor), an ASIC (Application Specific Integrated Circuit), a PLD (Programmable Logic Device), or an FPGA (Field Programmable Gate Array), and the hardware may implement some or all of respective functional blocks. For example, the processor 1001 may be implemented as at least one of these pieces of hardware.

The terms described in this specification and/or the terms involved in understanding this specification may be replaced with terms having the same or similar meanings. The channels and/or symbols, for example, may be replaced with signals (signaling). The signals may be implemented as messages. The CCs (Component Carriers) may also be referred to as, e.g., cells, frequency carriers, or carrier frequencies.

The radio frame may include one or more periods (frames) in a time domain. Each of these one or more periods (frames) forming the radio frame may also be called a subframe. The subframe may include one or more slots in the time domain. The slot may include one or more symbols (e.g., OFDM symbols or SC-FDMA symbols) in the time domain.

The radio frame, the subframe, the slot, and the symbol are units of time to transmit signals. The radio frame, the subframe, the slot, and the symbol may be referred to as other names corresponding to them. For example, one subframe may be referred to as a TTI (Transmission Time Interval), a set of consecutive subframes may be referred to as a TTI, or one slot may be referred to as a TTI. In other words, the subframe or the TTI may be a subframe (1 ms) in the existing LTE, a period (e.g., 1 to 13 symbols) shorter than 1 ms, or a period longer than 1 ms.

The TTI means, for example, the minimum time unit of scheduling in wireless communication. For example, in the LTE systems, the radio base station performs scheduling in which radio resources (e.g., a frequency bandwidth and a transmitted power available in each user terminal) are allocated to each user terminal, for each TTI. The definition of the TTI is not limited to this.

A TTI having a time length of 1 ms may also be referred to as, e.g., a normal TTI (the TTI in LTE Rel. 8-12), a long TTI, a normal subframe, or a long subframe. A TTI shorter than the normal TTI may be referred to as, e.g., a shortened TTI, a short TTI, a shortened subframe, or a short subframe.

The RB (Resource Block) is a unit of resource allocation in a time domain and a frequency domain, and may include one or more consecutive subcarriers in the frequency domain. The RB may include one or more symbols or may be one slot, one subframe, or the length of one TTI in the time domain. One TTI or one subframe may include one or more resource blocks. The RB may also be referred to as, e.g., a PRB (Physical RB (Resource Block)), a PRB pair, or an RB pair.

The resource block may include one or more REs (Resource Elements). One RE may serve as, e.g., a radio resource region having one subcarrier or one symbol.

The structures of, e.g., the above-mentioned radio frame, subframe, slot, and symbol are merely examples. Various changes can be made to configurations such as the number of subframes included in the radio frame, the number of slots included in the subframe, the numbers of symbols and RBs included in the slot, the number of subcarriers included in the RB, and the number of symbols, the symbol length, and the CP (Cyclic Prefix) length in the TTI.

The information, parameters, and the like described in this specification may be represented by absolute values, values relative to certain values, or other types of equivalent information. The radio resources, for example, may be indicated by predetermined indices.

The information, signals, and the like described in this specification may be represented using any of diverse techniques. Data, instructions, commands, information, signals, bits, symbols, chips, and the like that may be referred to throughout the above description, for example, may be represented by voltages, currents, electromagnetic waves, magnetic fields or particles, optical fields or photons, or any combination thereof.

Software, instructions, information, and the like may be transmitted and received via transmission media. When, for example, software is transmitted from websites, servers, or other remote sources using wired technologies (e.g., a coaxial cable, an optical fiber cable, a twisted pair, and a DSL (Digital Subscriber Line)) and/or wireless technologies (e.g., infrared and microwave technologies), these wired technologies and/or wireless technologies fall within the definition of the transmission media.

The radio base station in this specification may be read as a user terminal. The respective aspects/embodiments of the present invention may be applied to, e.g., the substitution of D2D (Device-to-Device) communication between user terminals for communication between the radio base station and the user terminal. In this case, the user terminal 20 may have the above-mentioned functions of the radio base station 10. Further, the words "uplink," "downlink," and the like may be read as "sides." The uplink channel, for example, may be read as a side channel.

Similarly, the user terminal in this specification may be read as a radio base station. In this case, the radio base station 10 may have the above-mentioned functions of the user terminal 20.

The respective aspects/embodiments described in this specification may be used solely, used in combination, or switchably used upon execution. The notification of predetermined information (e.g., the notification of "X") is not limited to explicit notification, and may be done implicitly (e.g., without notification of the predetermined information).

The information notification is not limited to the aspects/embodiments described in this specification and may be done using other methods. The information notification may be done by, e.g., physical layer signaling (e.g., DCI (Downlink Control Information) or UCI (Uplink Control Information)), upper layer signaling (e.g., RRC (Radio Resource Control) signaling, broadcast information (e.g., an MIB (Master Information Block) or an SIB (System Information Block)), or MAC (Medium Access Control) signaling), other signals, or a combination thereof.

The RRC signaling may also be referred to as RRC messages, which may include, e.g., RRC connection setup (RRCConnectionSetup) messages and RRC connection reconfiguration (RRCConnectionReconfiguration) messages. The MAC signaling may be notified by, e.g. a MAC CE (Control Element).

The respective aspects/embodiments described in this specification may be applied to systems which utilize LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA2000, UMB (Ultra Mobile Broadband), IEEE 802.11 (Wi-Fi®), IEEE 802.16 (Wi-MAX®), IEEE 802.20, UWB (Ultra-WideBand), Bluetooth®, and systems using other types of appropriate radio communication methods, and/or next-generation systems extended on the basis of these systems.

The processing procedures, sequences, flowcharts, and the like of the aspects/embodiments described in this specification may be executed in different orders as long as consistency can be ensured. The method described in this specification, for example, presents elements of various steps in an exemplary order, and is not limited to the presented specific order.

Although the present invention has been described in detail above, it will be apparent for those skilled in the art that the present invention is not limited to the embodiments described in this specification. For example, the above-described embodiments may be used independently or in combination. The present invention can be carried out as modifications and changed aspects without departing from the spirit and scope of the present invention defined by the description of the scope of claims. The description of this specification is for illustrative purpose and is not intended to limit the present invention in any way.

This application is based on Japanese Patent Application No. 2016-038174 filed on Feb. 29, 2016, the contents of which are incorporated herein in their entirety.

The invention claimed is:

1. A terminal comprising:
   a transmitter that transmits at least one capability information concerning a supportable delay; and
   a processor coupled to the transmitter, the processor performs control of a transmission of a given uplink radio resource at a time interval of not less than the supportable delay,
   wherein the capability information comprises first capability information concerning a delay taken to transmit an uplink control signal after reception of a downlink data signal.

2. The terminal according to claim 1, wherein the capability information comprises second capability information concerning a second delay taken to transmit an uplink data signal after reception of a downlink control signal.

3. The terminal according to claim 1, wherein the processor determines the supportable delay based on a subcarrier spacing.

4. A radio communication method for a terminal, comprising:
   transmitting at least one capability information concerning a supportable delay; and
   performing control of a transmission of a given uplink radio resource at a time interval of not less than the supportable delay,
   wherein the capability information comprises first capability information concerning a delay taken to transmit an uplink control signal after reception of a downlink data signal.

5. The radio communication method according to claim 4, wherein the capability information comprises second capability information concerning a second delay taken to transmit an uplink data signal after reception of a downlink control signal.

6. A base station comprising:
   a receiver that receives at least one capability information concerning a supportable delay from a terminal; and
   a processor coupled to the receiver, the processor performing control of reception of an uplink signal that is transmitted from the terminal by using a given uplink radio resource at a time interval of not less than the supportable delay,
   wherein the capability information comprises first capability information concerning a delay taken for the terminal to transmit an uplink control signal after reception of a downlink data signal.

* * * * *